United States Patent
Ahn et al.

(10) Patent No.: US 9,236,186 B2
(45) Date of Patent: Jan. 12, 2016

(54) MULTI-LAYERED CERAMIC CAPACITOR

(71) Applicant: Samsung Electro-Mechanics Co., Ltd., Suwon, Gyunggi-do (KR)

(72) Inventors: Young Ghyu Ahn, Suwon (KR); Doo Young Kim, Suwon (KR); Jong Ho Lee, Suwon (KR); Min Cheol Park, Suwon (KR); Sang Soo Park, Suwon (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 115 days.

(21) Appl. No.: 13/670,110

(22) Filed: Nov. 6, 2012

(65) Prior Publication Data

US 2014/0104750 A1 Apr. 17, 2014

(30) Foreign Application Priority Data

Oct. 12, 2012 (KR) .................. 10-2012-0113818

(51) Int. Cl.
*H01G 4/232* (2006.01)
*H01G 4/30* (2006.01)
(Continued)

(52) U.S. Cl.
CPC ............ *H01G 4/232* (2013.01); *H01G 4/005* (2013.01); *H01G 4/12* (2013.01); *H01G 4/30* (2013.01)

(58) Field of Classification Search
CPC ......... H01G 4/232; H01G 4/228; H01G 4/12; H01G 4/30

USPC .............................................. 361/321.2, 306.3
See application file for complete search history.

(56) References Cited

U.S. PATENT DOCUMENTS 4,771,520 A * 9/1988 Tanaka et al. ............... 29/25.42
6,381,120 B2 * 4/2002 Sakai ......................... 361/321.2
(Continued)

FOREIGN PATENT DOCUMENTS

JP 08279436 A * 10/1996
JP 09045830 A * 2/1997
(Continued)

OTHER PUBLICATIONS

Japanese Office Action with English translation thereof, issued in Japanese Patent Application No. 2012-269641 dated Dec. 17, 2013.
(Continued)

*Primary Examiner* — David M Sinclair
(74) *Attorney, Agent, or Firm* — McDermott Will & Emery LLP

(57) ABSTRACT

There is provided a multi-layered ceramic capacitor including: a ceramic body formed by multi-layering a plurality of dielectric layers; a plurality of first and second internal electrodes including at least one side exposed through edges of the dielectric layer; upper and lower cover layers formed at upper and lower portions of the ceramic body, respectively; first and second external electrodes formed to be spaced apart from each other at a lower surface of the lower cover layer; first and second connecting electrodes contacting outer peripheral surfaces of a plurality of second and first margin to connect exposed portions of the plurality of first and second internal electrodes, respectively; and an insulating side part formed so as to cover lateral surfaces at which the first and second internal electrodes are exposed.

19 Claims, 38 Drawing Sheets

(51) Int. Cl.
 *H01G 4/005* (2006.01)
 *H01G 4/12* (2006.01)

(56) References Cited

U.S. PATENT DOCUMENTS

| | | | |
|---|---|---|---|
| 6,452,781 B1 * | 9/2002 | Ahiko et al. | 361/321.2 |
| 6,912,115 B2 * | 6/2005 | Kobayashi et al. | 361/306.3 |
| 7,495,885 B2 * | 2/2009 | Togashi et al. | 361/306.3 |
| 7,644,480 B2 * | 1/2010 | Kim et al. | 29/25.42 |
| 8,395,881 B2 * | 3/2013 | Togashi | 361/306.3 |
| 8,405,954 B2 * | 3/2013 | Koga et al. | 361/303 |
| 2006/0291138 A1 | 12/2006 | Kang et al. | |
| 2009/0002920 A1 | 1/2009 | Itamura et al. | |
| 2010/0025075 A1 * | 2/2010 | Feichtinger et al. | 174/126.1 |
| 2010/0290173 A1 | 11/2010 | Yoon et al. | |
| 2012/0188682 A1 * | 7/2012 | Sato et al. | 361/305 |
| 2012/0300361 A1 * | 11/2012 | Togashi | 361/301.4 |
| 2013/0020905 A1 * | 1/2013 | Sawada et al. | 310/311 |

FOREIGN PATENT DOCUMENTS

| | | | |
|---|---|---|---|
| JP | 2002015939 A * | 1/2002 | |
| JP | 2006013384 A * | 1/2006 | |
| JP | 2008-258481 A | 10/2008 | |
| JP | 2009026872 A * | 2/2009 | |
| JP | 2009054973 A * | 3/2009 | |
| KR | 10-2006-0134277 A | 12/2006 | |
| KR | 10-2010-0122286 A | 11/2010 | |

OTHER PUBLICATIONS

Examination Report dated Jul. 25, 2014 issued in the corresponding Taiwanese Patent Application No. 101141739 (English Translation).

* cited by examiner

MULTI-LAYERED CERAMIC CAPACITOR

CROSS-REFERENCE TO RELATED APPLICATIONS

This application claims the priority of Korean Patent Application No. 10-2012-0113818 filed on Oct. 12, 2012, in the Korean Intellectual Property Office, the disclosure of which is incorporated herein by reference.

BACKGROUND OF THE INVENTION

1. Field of the Invention

The present invention relates to a multi-layered ceramic capacitor.

2. Description of the Related Art

In general, a multi-layered ceramic capacitor (MLCC), which is one of electronic components using a ceramic material, has advantages such as miniaturization, high capacitance, and easiness of mounting.

Due to these advantages, the multi-layered ceramic capacitor is mounted on circuit boards of various electronic products such as a display device, for example, a liquid crystal display (LCD), a plasma display panel (PDP), or the like, a computer, a personal digital assistants (PDA), a mobile phone, and the like, to serve to charge electricity or discharge electricity.

Recently, as electronic products have been gradually miniaturized, microminiaturization and super high capacitance of the multi-layered ceramic capacitor used in the electronic products has been required.

In order to implement the super high capacitance of the multi-layered ceramic capacitor, a method of increasing the number of multi-layered dielectric layers or permittivity while thinning thicknesses of the dielectric layer and internal electrodes, or a method of increasing an overlapped area between internal electrodes having different polarities, or the like, may be used.

However, as a structure of the multi-layered ceramic capacitor is variously changed for miniaturization thereof, among the above methods, it may be difficult to use the method of increasing the number of multi-layered dielectric layers or permittivity while thinning thicknesses of the dielectric layer and internal electrodes.

Therefore, in order to increase the capacitance of the product simultaneously with implementing microminiaturization of the capacitor, research into the method of increasing an overlapped area between internal electrodes having different polarities has been required.

The following Related Art Document 1 has disclosed first and second external electrodes formed at a lower surface of a ceramic multi-layered body and electrically connected to first and second connecting electrode members connected to first and second side electrodes members, respectively.

RELATED ART DOCUMENT (Patent Document 1) Korean Patent Laid-open Publication No. 10-2010-0122286

SUMMARY OF THE INVENTION

An aspect of the present invention provides a multi-layered ceramic capacitor capable of increasing a capacitance of a product while miniaturizing the product by increasing an overlapped area between internal electrodes having different polarities.

According to an aspect of the present invention, there is provided a multi-layered ceramic capacitor including: a ceramic body including a plurality of dielectric layers multi-layered therein; a plurality of first and second internal electrodes alternately formed on the plurality of dielectric layers, having at least one first and second groove parts that are not overlapped with each other at at least one side thereof, respectively, so that first and second margin parts that are not overlapped with each other are formed on the plurality of dielectric layers, and including at least one side exposed through edges of the dielectric layer; upper and lower cover layers formed at upper and lower portions of the ceramic body, respectively; first and second external electrodes formed to be spaced apart from each other at a lower surface of the lower cover layer; a first connecting electrode contacting outer peripheral surfaces of a plurality of second margin parts vertically overlapped with each other to connect exposed portions of the plurality of first internal electrodes to each other and including a lower end portion electrically connected to the first external electrode; a second connecting electrode contacting outer peripheral surfaces of a plurality of first margin parts vertically overlapped with each other to connect exposed portions of the plurality of second internal electrodes to each other and including a lower end portion electrically connected to the second external electrode; and an insulating side part formed so as to cover lateral surfaces of the ceramic body and the upper and lower cover layers at which the first and second internal electrodes are exposed.

According to another aspect of the present invention, there is provided a multi-layered ceramic capacitor including: a ceramic body formed including a plurality of dielectric layers multi-layered therein; a plurality of first and second internal electrodes alternately formed on the plurality of dielectric layers, having at least one first and second groove parts that are not overlapped with each other at at least one side thereof, respectively, so that first and second margin parts that are not overlapped with each other are formed on the plurality of dielectric layers, and including at least one side exposed through edges of the dielectric layer; upper and lower cover layers formed at upper and lower portions of the ceramic body, respectively; first and second external electrodes formed to be spaced apart from each other at a lower surface of the lower cover layer; a first via electrode vertically penetrating through the second margin parts so as not to contact inner peripheral surfaces of the second groove parts to vertically connect the plurality of first internal electrodes to each other and including a lower end portion penetrating through the lower cover layer to be electrically connected to the first external electrode; a second via electrode vertically penetrating through the first margin parts so as not to contact inner peripheral surfaces of the first groove parts to vertically connect the plurality of second internal electrodes to each other and including a lower end portion penetrating through the lower cover layer to be electrically connected to the second external electrode; and an insulating side part formed so as to cover lateral surfaces of the ceramic body and the upper and lower cover layers at which the first and second internal electrodes are exposed.

The lower cover layer may have a thickness thicker than that of the upper cover layer.

When a half of a thickness of a portion including the ceramic body and the upper and lower cover layers is defined as A, a thickness of the lower cover layer is defined as B, and a half of a thickness of the ceramic body is defined as C, a ratio in which a central portion of the ceramic body deviates from a central portion of the portion including the ceramic body and the upper and lower cover layers in a thickness direction, that is, (B+C)/A may satisfy a range of 1.06 to 1.8 (1.06≤(B+C)/A≤1.8).

The lower cover layer may have a thickness of 50 to 400 μm.

The insulating side part may be formed of at least one material selected among an insulating resin, an insulating ceramic material, and an insulating resin filler.

The first groove part may be formed at at least one corner part of the first internal electrode and the second groove part may be formed at at least one of the remaining corner parts of the second internal electrode that is not overlapped with the first groove part.

The first groove part may be formed at each of two corner parts of one surface of the first internal electrode, and the second groove part may be formed at each of two corner parts of the other surface of the second internal electrode.

The first and second groove parts may be formed to diagonally face each other.

The first and second groove parts may be formed at both end sides of the first and second internal electrodes facing each other, respectively.

The first and second groove parts may be formed at lateral sides of the first and second internal electrodes facing each other, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1A:
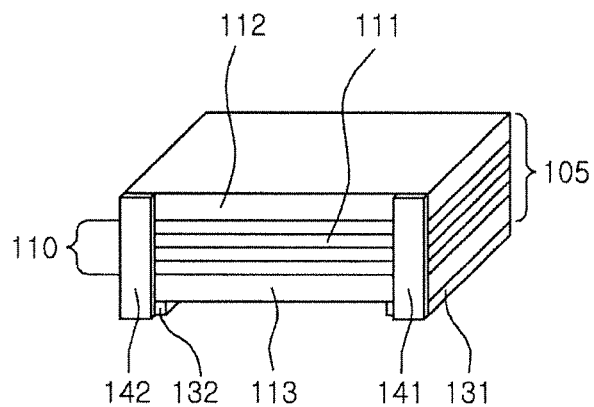
FIGS. 1A through 1E are schematic perspective views showing a multi-layered ceramic capacitor according to an embodiment of an aspect of the present invention.
Figure 1B:
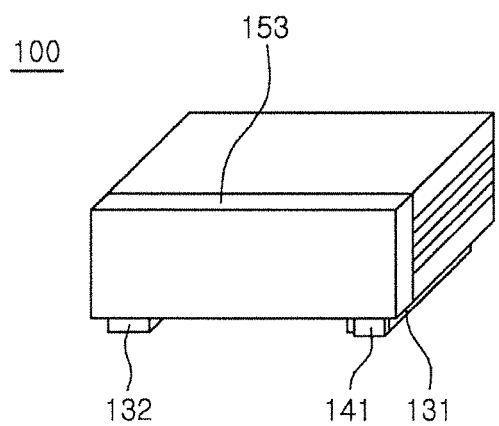
Figure 1C:
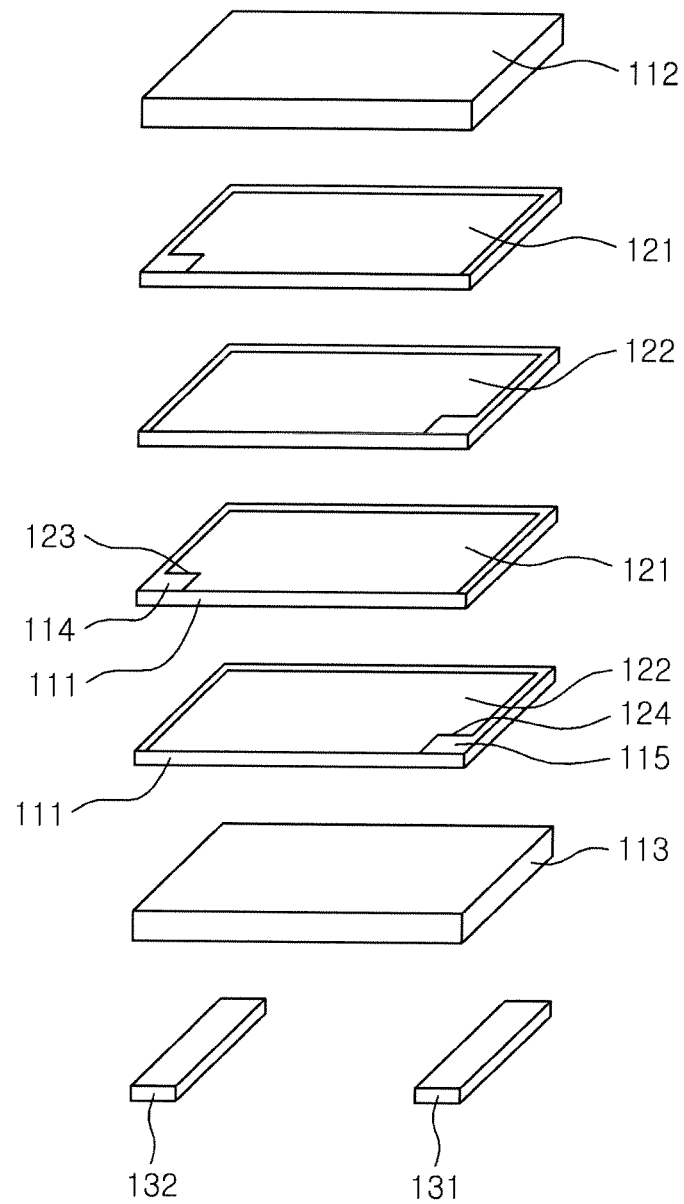
Figure 1D:
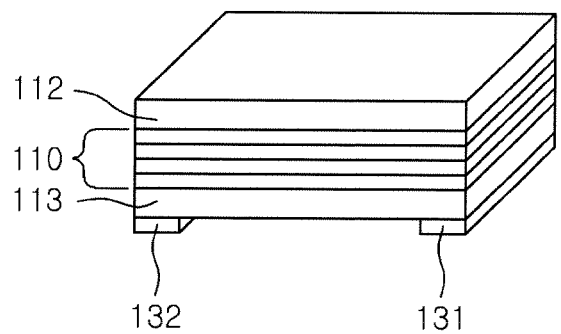
Figure 1E:
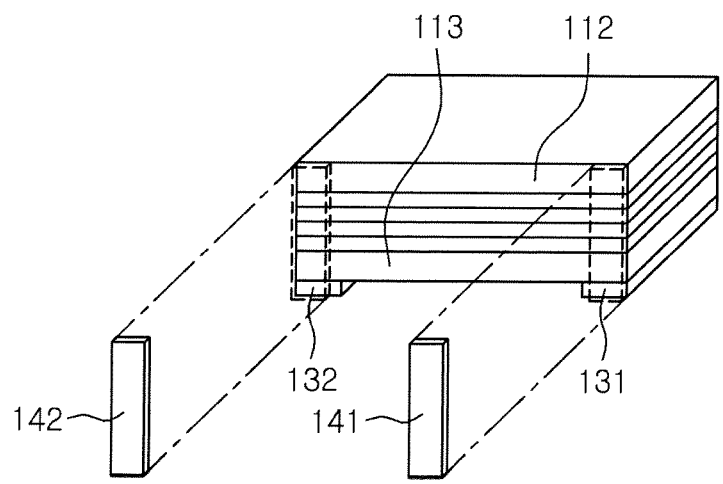
Figure 2A:
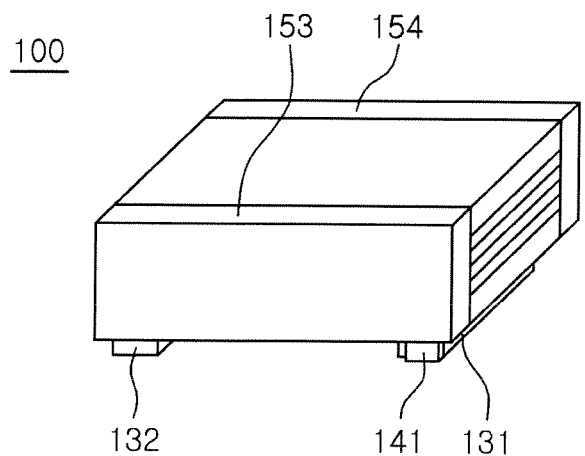
FIGS. 2A through 2D are schematic perspective views showing a multi-layered ceramic capacitor according to another embodiment of the present invention.
Figure 2B:
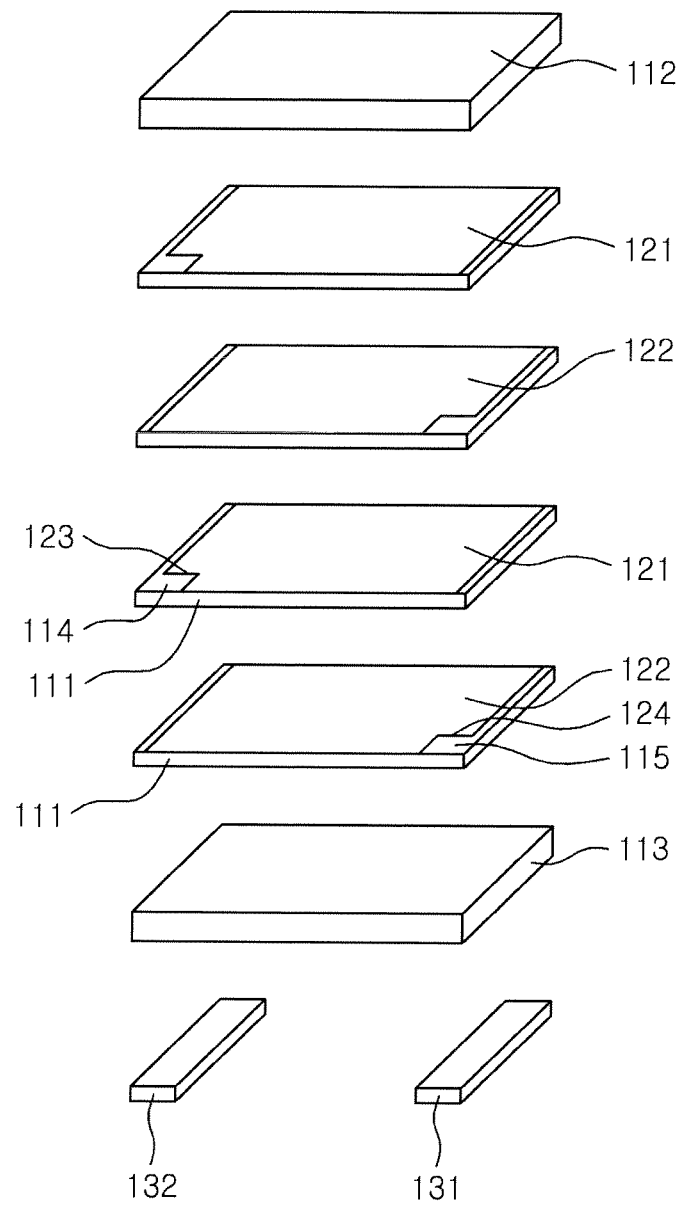
Figure 2C:
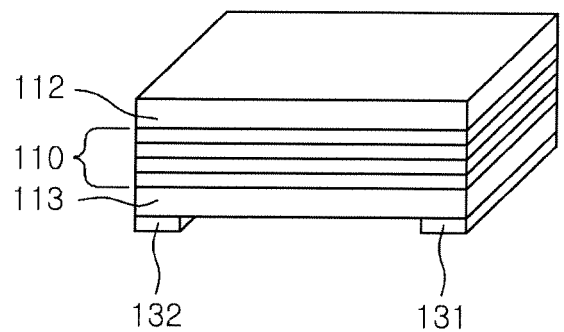
Figure 2D:
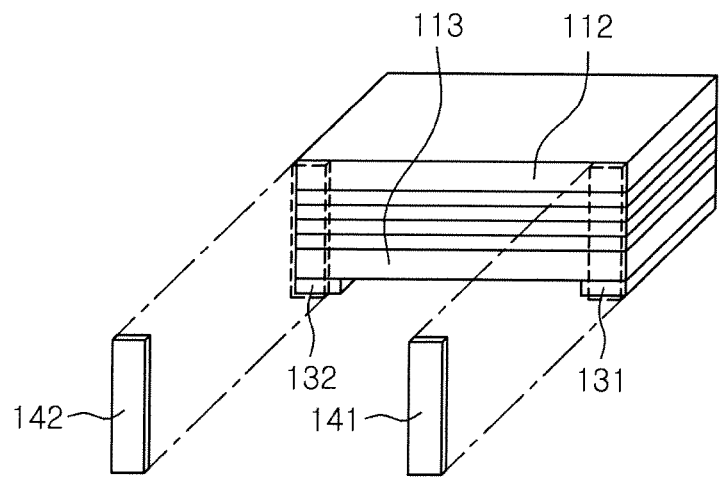

Embodiments of the present invention will now be described in detail with reference to the accompanying drawings.

The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art.

Shapes and sizes of components shown in the drawings may be exaggerated in order to provide more clear description.

Further, like reference numerals will be used to designate like components having similar functions throughout the drawings within the scope of the present invention.

Referring to FIGS. 1A through 1E, a multi-layered ceramic capacitor 100 according to an embodiment of the present invention may include a ceramic body 110, first and second internal electrodes 121 and 122, upper and lower cover layers 112 and 113, first and second connecting electrodes 141 and 142, first and second external electrodes 131 and 132, and an insulating side part 153.

The ceramic body 110 is formed by multi-layering a plurality of dielectric layers 111, and in this case, a shape and dimensions of the ceramic body 110 and the number of multi-layered dielectric layers 111 are not limited to the present embodiment shown in the drawings.

In addition, the plurality of dielectric layers 111 configuring the ceramic body 110 may be integrated so as not to firm a boundary between dielectric layers adjacent to each other in a sintered state.

The dielectric layer 111 as described above may contain a ceramic powder having high permittivity, for example, a barium titanate ($BaTiO_3$) based power or a strontium titanate ($SrTiO_3$) based powder, or the like, but the present invention is not limited thereto.

The first and second internal electrodes 121 and 122, which are a pair of electrodes having different polarities from each other, may be alternately formed in a direction in which the dielectric layers 111 are multi-layered by printing a conductive paste on the plurality of dielectric layers at a predetermined thickness.

As a printing method of the conductive paste, a screen printing method, a gravure printing method, or the like, may be used, but the present invention is not limited thereto.

These first and second internal electrodes 121 and 122 may have at least one first and second groove parts 123 and 124 in at least one side, respectively, so that first and second margin parts 114 and 115 are formed at positions that are not overlapped with each other on the dielectric layers 111 in the direction in which the dielectric layers 111 are multi-layered.

In this case, an overlapped area between the first and second internal electrodes is a portion contributing to forming a capacitance of the capacitor. In the present embodiment, portions except for the first and second groove parts 123 and 124 in the first and second internal electrode 121 and 122 may be exposed to the outside through edges of the dielectric layer 111.

Therefore, areas of the first and second internal electrodes 121 and 122 formed on the dielectric layer 111 are significantly increased, such that the overlapped area between the first and second internal electrodes may be increased.

That is, when a predetermined voltage is applied to the first and second external electrode 131 and 132, electric charges may be accumulated between the first and second internal electrodes 121 and 122 through the first and second connecting electrodes 141 and 142. In this case, since the capacitance of the multi-layered ceramic capacitor 100 is in proportion to the overlapped area between the first and second internal electrodes 121 and 122, the capacitance of the capacitor may be increased without using the existing method of increasing the number of multi-layered dielectric layers or permittivity while thinning thicknesses of the dielectric layer and internal electrodes.

In the present embodiment, the case in which a front side of the first and second internal electrodes 121 and 122 is exposed through an edge of the dielectric layer 111 and the remaining three sides are formed to have the margin parts in the dielectric layer 111 is shown and described. Therefore, one insulating side part 153 may be formed at the front surface of the ceramic body 110.

However, the present invention is not limited thereto, but front and back sides of the first and second internal electrodes 121 and 122 may be exposed through edges of the dielectric layer 111 and the margin parts may be formed at left and right portions of the dielectric layer 111 as shown in FIGS. 2A through 2D. Therefore, insulating side parts 153 and 154 may be formed at the front and back surfaces of the ceramic body 110, respectively.

Figure 3A:
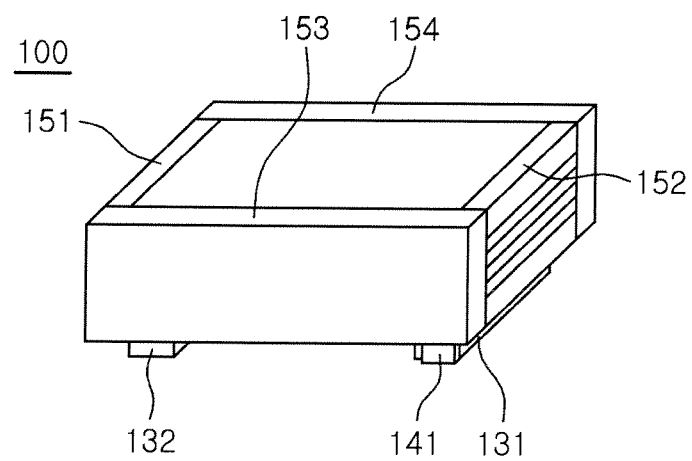
FIGS. 3A through 3C are schematic perspective views showing a multi-layered ceramic capacitor according to another embodiment of the present invention.
Figure 3B:
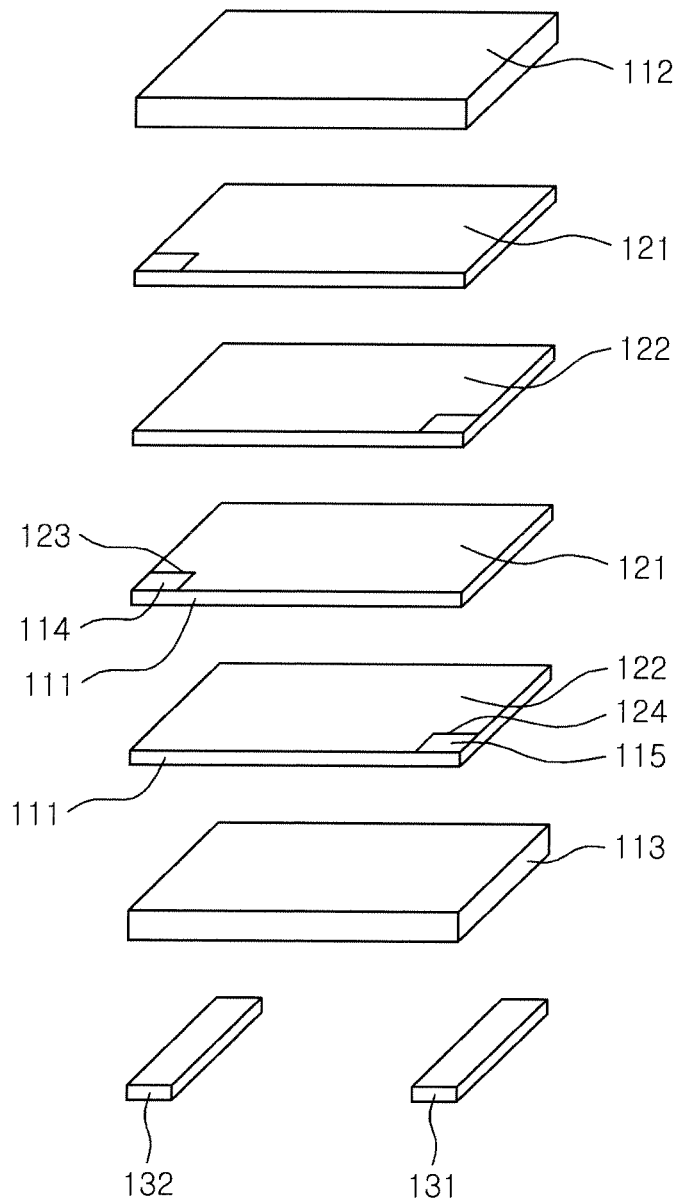
Figure 3C:
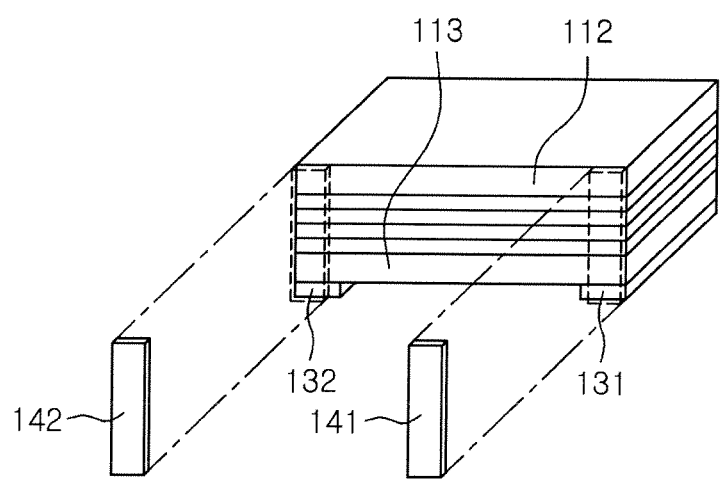

In addition, as shown in FIGS. 3A through 3C, all of the four sides of the first and second internal electrodes 121 and 122 except for the first and second margin parts 114 and 115 may be exposed through edges of the dielectric layer ill.

In this case, insulating side parts 151 through 154 may be formed at all of the four lateral surfaces of the ceramic body so as to cover all of the exposed portions of the first and second internal electrodes 121 and 122.

Meanwhile, in the present embodiment, the case in which the first and second groove parts 123 and 124 are formed at corner parts of both ends of the front side of the first and second internal electrodes 121 and 122, respectively, and accordingly, the first and second margin parts 114 and 115 are formed at corner parts of both ends of the front side of each of the dielectric layers on which the first or second internal electrode 121 or 122 is formed is shown.

However, positions of the first and second groove parts and the first and second margin parts of the present invention may be variously changed as needed, and the present invention is not limited thereto.

Various examples of the first and second groove parts and the first and second margin parts will be described with reference to the related drawings in the following other embodiments of the present invention.

The first connecting electrode 141 may vertically contact outer peripheral surfaces of a plurality of second margin parts 115 disposed in the direction in which the dielectric layers 111 are multilayered to vertically connect portions of a plurality of first internal electrodes 121 exposed through the edge of the dielectric layer 111 to each other.

The second connecting electrode 142 may vertically contact outer peripheral surfaces of the plurality of first margin parts 114 disposed in the direction in which the dielectric layers 111 are multi-layered to vertically connect portions of a plurality of second internal electrodes 122 exposed through the edge of the dielectric layer 111 to each other.

That is, the first and second connecting electrodes 141 and 142 may electrically connect the plurality of first and second internal electrodes 121 and 122 multi-layered in the ceramic body 110, that is, from first and second internal electrodes 121 and 122 positioned at the uppermost position to first and second internal electrodes 121 and 122 positioned at the lowermost position, respectively, and lower end portions of the first and second connecting electrodes 141 and 142 may be long extended so as to be exposed downwardly of the lower cover layer 113.

The first and second external electrodes 131 and 132 may be formed to be spaced apart from each other at a lower surface of the lower cover layer 114 and contact the lower end portions of the first and second connecting electrodes 141 and 142 exposed downwardly to be electrically connected thereto, respectively.

The insulating side part 151, 152, 153, or 154 may be formed at at least one lateral surface of the ceramic body 110 and the upper and lower cover layers 112 and 113 so as to cover and insulate portions of the plurality of first and second internal electrodes 121 and 122 exposed through the edges of the dielectric layers and the first and second connecting electrodes 141 and 142.

The insulating side parts 151 to 154 may be formed of at least one material selected among an insulating resin, an insulating ceramic material, and an insulating resin filler.

These insulating side parts 151 to 154 may increase durability of a capacitor body 105 (a portion including the ceramic body and the upper and lower cover layers) and secure a margin having a predetermined thickness to serve to increase reliability of the capacitor.

In this case, since the insulating side parts 151 to 154 are formed after the ceramic body 110 is formed, a size of the product may be significantly reduced by reducing a thickness in a range in which insulation of the first and second internal electrodes 121 and 122 and reliability of the capacitor are maintained.

These insulating side parts 151 to 154 may be formed by molding a non-conductive material at the lateral surfaces of the ceramic body 110 and the upper and lower cover layers 112 and 113 or by attaching the required number of separate ceramic sheets to the lateral surfaces enclosing the ceramic body 110 and the upper and lower cover layers 112 and 113, but the present invention is not limited thereto.

The upper and lower cover layers 112 and 113 may be formed at upper and lower portions of the ceramic body 110, respectively and have the same material and configuration as those of the dielectric layer 111 except that internal electrodes are not included therein. These upper and lower cover layers 112 and 113 may basically serve to prevent the first and second internal electrodes 121 and 122 from being damaged by physical or chemical stress.

Figure 4A:
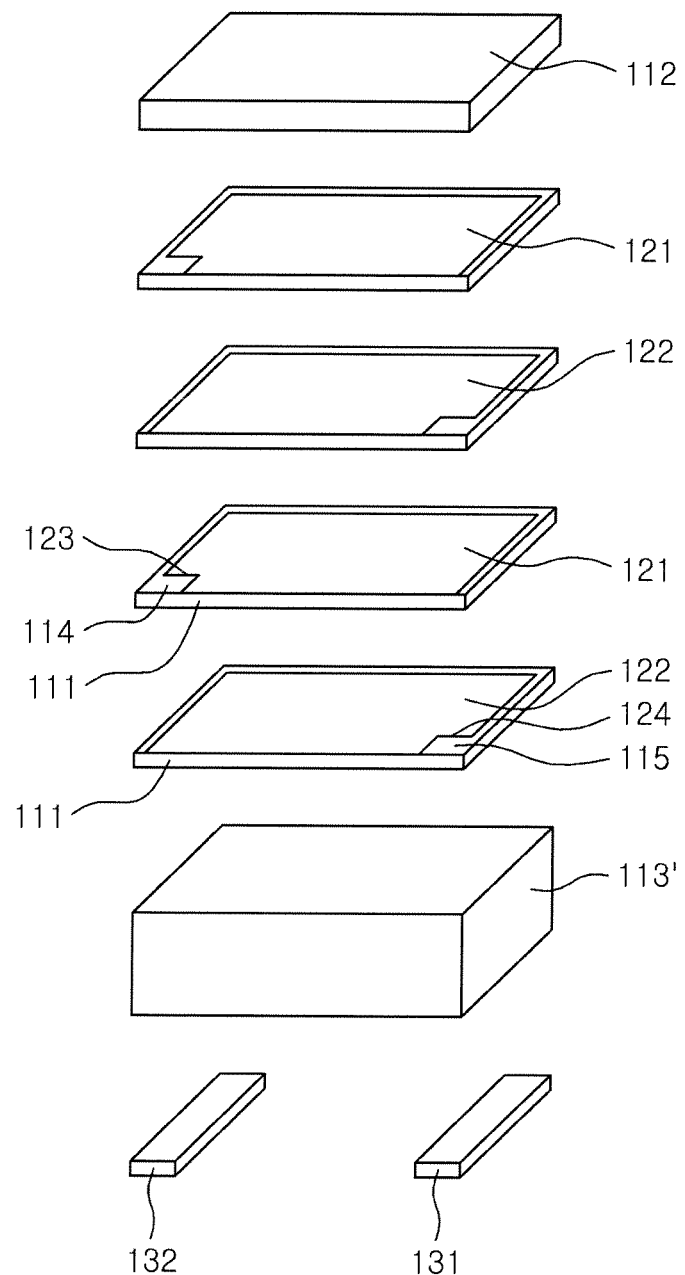
FIGS. 4A and 4B are schematic perspective views showing a multi-layered ceramic capacitor according to another embodiment of the present invention.
Figure 4B:
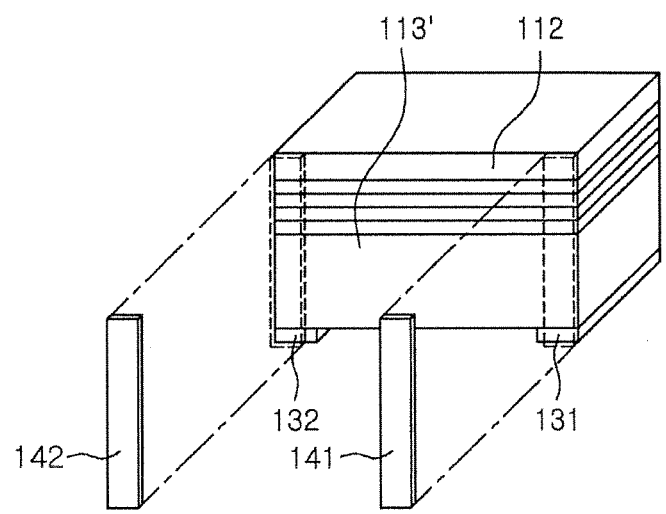

Referring to FIGS. 4A and 4B, a lower cover layer 113' may have a thickness thicker than that of the upper cover layer 112 by increasing the number of multi-layered ceramic sheets.

When the multi-layered ceramic capacitor 100 is mounted on a printed circuit board (not shown) by a solder (not shown) and voltages having different polarities are applied to the first and second external electrodes 131 and 132, the ceramic body may be expanded and contracted in the direction of the dielectric layers 111 are multilayered by an Inverse piezoelectric effect of the dielectric layer 111, and both ends of the first and second external electrodes in a length direction may be expanded and contracted by Poisson effect, as opposed to expansion and contraction of the capacitor body 105 in a thickness.

Here, a central portion of the ceramic body 110, which is a portion significantly expanded and contracted from both end portions of the first and second external electrodes 131 and 132 in the length direction, may be a factor causing generation of acoustic noise.

In the present embodiment, a ratio in which the central portion of the ceramic body 110 deviates from a central portion the capacitor body 105 in order to reduce the acoustic noise was defined.

The entire portion including the upper and lower cover layers 112 and 113' in addition to the ceramic body 110 was defined as the capacitor body 105, and a half of a thickness of the capacitor body 105 was defined as A, a thickness of the lower cover layer 113' was defined as B, a half of a thickness of the ceramic body 110 was defined as C, and a thickness of the upper cover layer 112 was defined as D.

In the present embodiment, the ratio in which the central portion of the ceramic body 110 deviates from the central portion the capacitor body 105, that is, $(B+C)/A$ may satisfy the range of 1.06 to 1.8 ($1.06 \leq (B+C)/A \leq 1.8$). When the ratio satisfies this range, since the maximum displacement of the multi-layered ceramic capacitor 100 may be an upper portion of the central portion of the capacitor body 105 based on the ceramic body 111, displacement transferred to the printed circuit board (not shown) through the solder (not shown) may be reduced, such that the acoustic noise may be reduced.

Figure 5A:
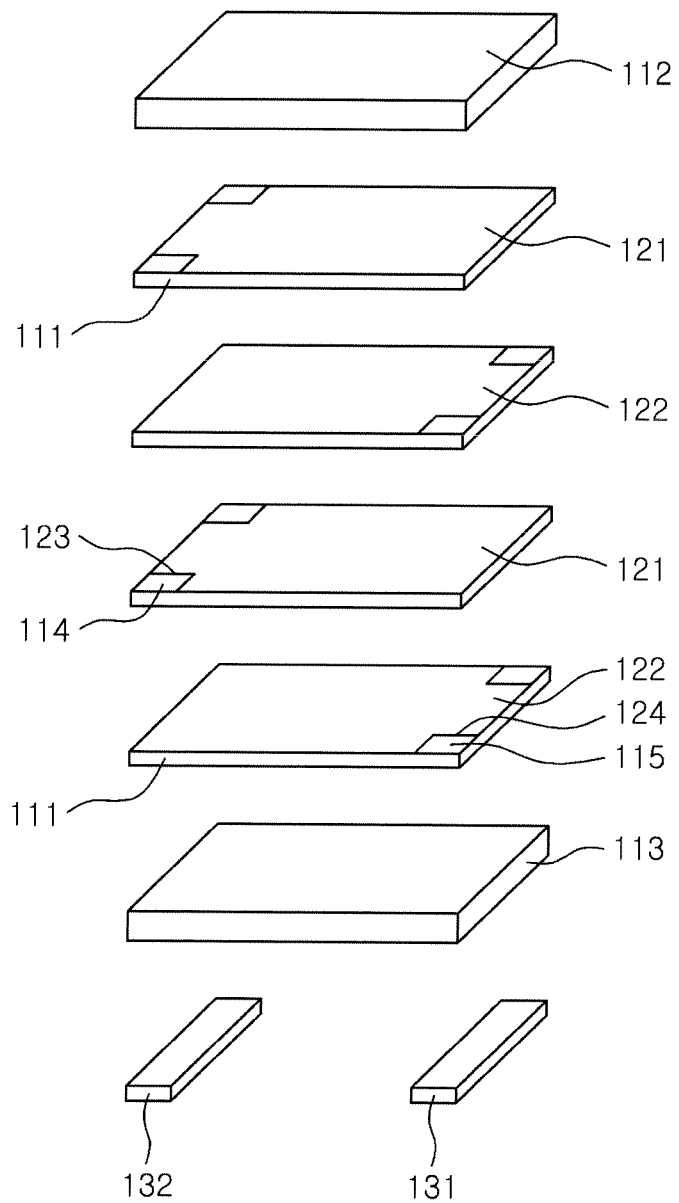
FIGS. 5A and 5B are schematic perspective views showing a multi-layered ceramic capacitor according to another embodiment of the present invention.
Figure 5B:
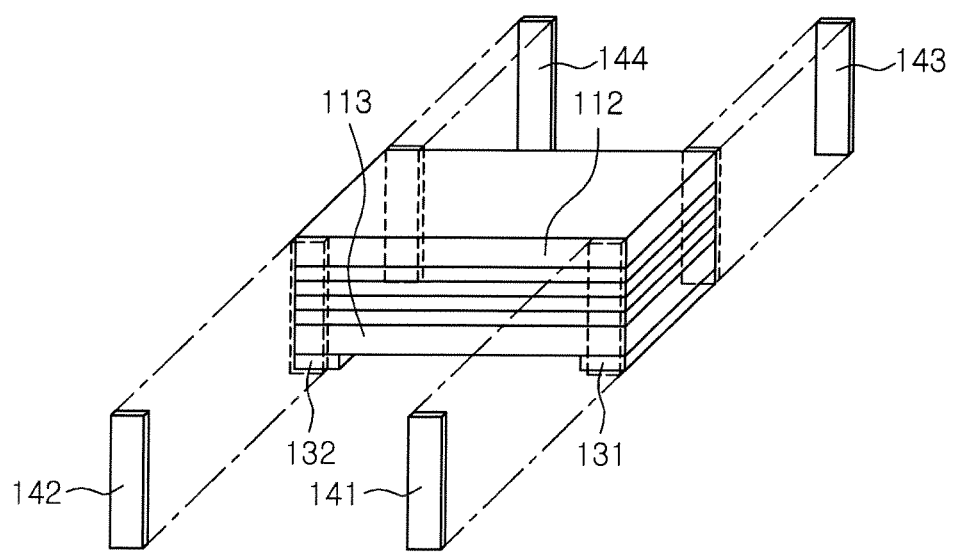

FIGS. 5A and 5B schematically show a multi-layered ceramic capacitor according to another embodiment of the present invention.

Referring to FIGS. 5A and 5B, a first groove part 123 may be formed at each of two corner parts of a left portion of the first internal electrode 121, and a second groove part 124 may be formed at each of two corner parts of a right portion of the second internal electrode 122.

In this case, two first margin parts 114 and two second margin parts 115 of the dielectric layer 111 may be formed to face each other at corner parts of both end surfaces of a dielectric layer 111 so as to correspond to the first and second groove parts 123 or 124, respectively.

In addition, first and second connecting electrodes 141 and 142 may vertically contact the second and first margin parts 115 and 114 at front surfaces of a ceramic body 110, respectively, to electrically connect the plurality of first and second internal electrodes 121 and 122 that are vertically overlapped with each other to each other in a vertical direction.

Here, since structures of the dielectric layer 111 of the ceramic body 110, the first and second internal electrodes 121 and 122, and upper and lower cover layers 112 and 113 are similar to those in the above-mentioned embodiment, a detailed description thereof will be omitted in order to avoid an overlapped description.

Figure 6A:
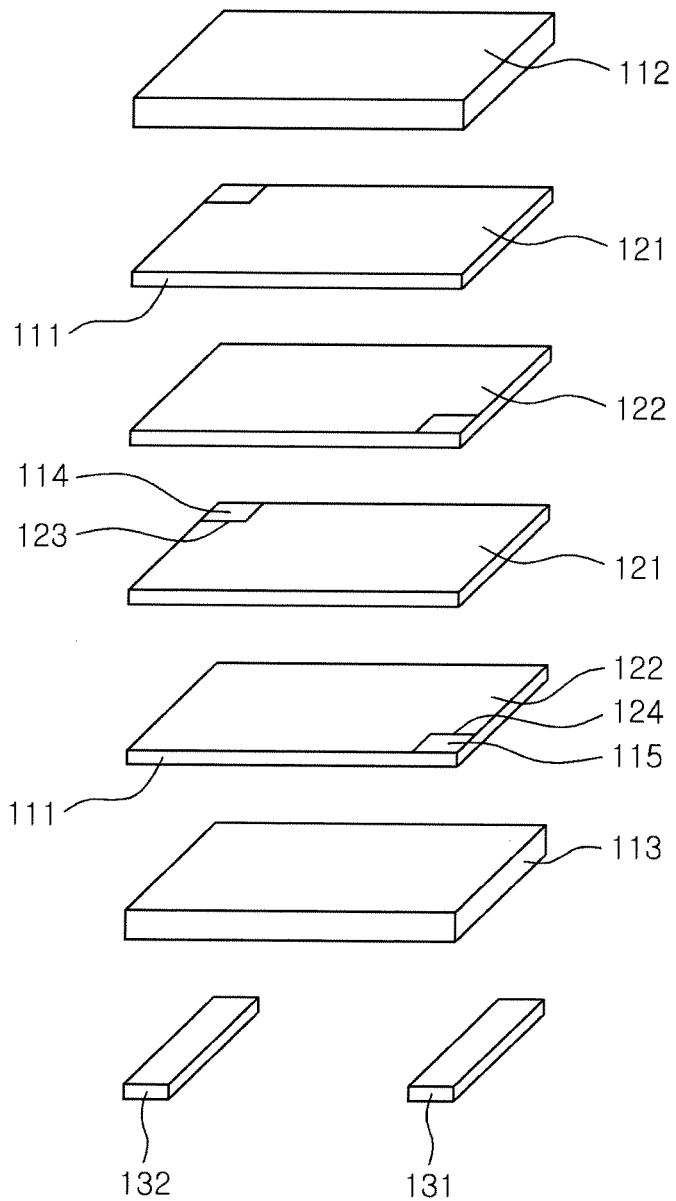
FIGS. 6A and 6B are schematic perspective views showing a multi-layered ceramic capacitor according to another embodiment of the present invention.
Figure 6B:
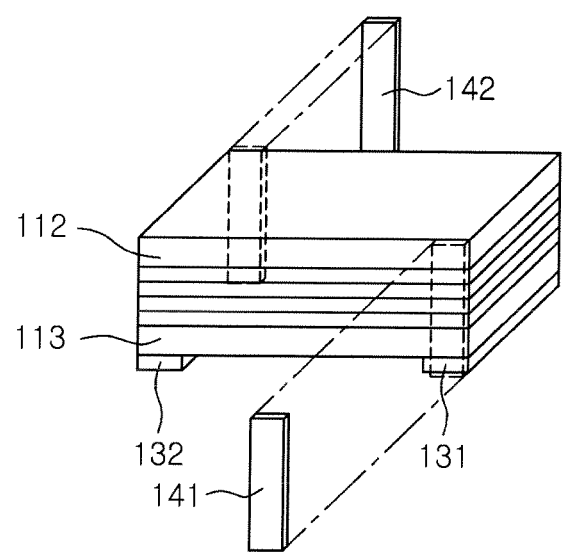

FIGS. 6A and 6B schematically show a multi-layered ceramic capacitor according to another embodiment of the present invention.

Referring to FIGS. 6A and 6B, first and second groove parts 123 and 124 may be formed to diagonally face each other at corner parts of first and second internal electrodes 121 and 122.

In this case, first and second margin parts 114 and 115 of a dielectric layer 111 may be formed to diagonally face each other at corner parts of the dielectric layer 111 so as to correspond to the first and second groove parts 123 or 124.

In addition, first and second connecting electrodes 141 and 142 may vertically contact the second and first margin parts 115 and 114 at both lateral surfaces of a ceramic body 110, respectively, to electrically connect the plurality of first and second internal electrodes 121 and 122 that are vertically overlapped with each other to each other in a vertical direction.

Here, since structures of the dielectric layer 111 of the ceramic body 110, the first and second internal electrodes 121 and 122, upper and lower cover layers 112 and 113, and first and second external electrodes are similar to those in the above-mentioned embodiment, a detailed description thereof will be omitted in order to avoid an overlapped description.

Figure 7A:
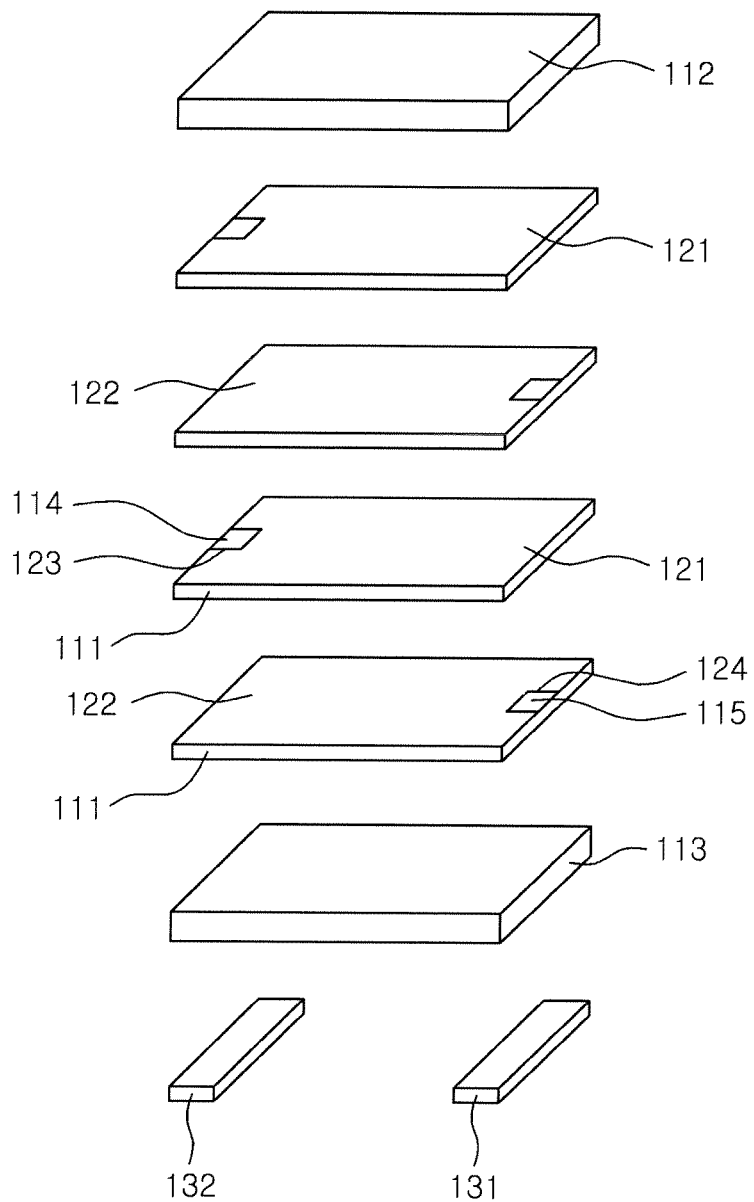
FIGS. 7A and 7B are schematic perspective views showing a multi-layered ceramic capacitor according to another embodiment of the present invention.
Figure 7B:
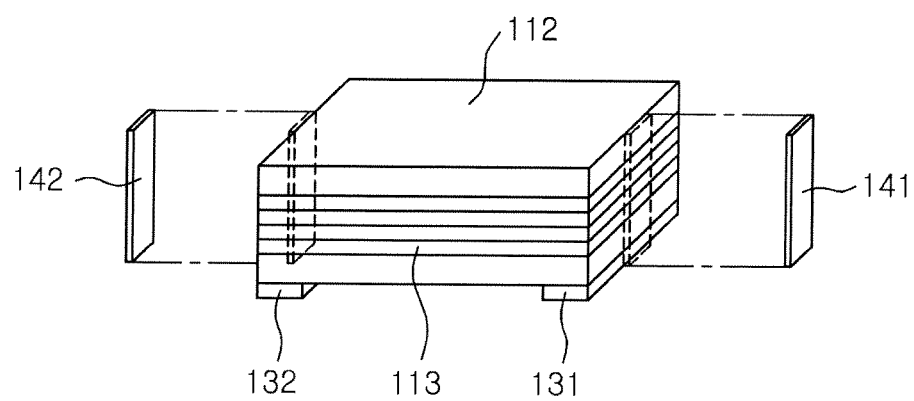

FIGS. 7A and 7B schematically show a multi-layered ceramic capacitor according to another embodiment of the present invention.

Referring to FIGS. 7A and 7B, first and second groove parts 123 and 124 may be formed to face each other at both end sides of first and second internal electrodes 121 and 122 in a length direction.

In this case, first and second margin parts 114 and 115 of a dielectric layer 111 may be formed to face each other in the vicinity of both end surfaces of the dielectric layer 111 in the length direction so as to correspond to the first and second groove parts 123 or 124.

In addition, first and second connecting electrodes 141 and 142 may vertically contact the second and first margin parts 115 and 114 at both end surfaces of a ceramic body 110, respectively, to electrically connect the plurality of first and second internal electrodes 121 and 122 that are vertically overlapped with each other to each other in a vertical direction.

Here, since structures of the dielectric layer 111 of the ceramic body 110, the first and second internal electrodes 121 and 122, upper and lower cover layers 112 and 113, and first and second external electrodes 131 and 132 are similar to those in the above-mentioned embodiment, a detailed description thereof will be omitted in order to avoid an overlapped description.

Figure 8A:
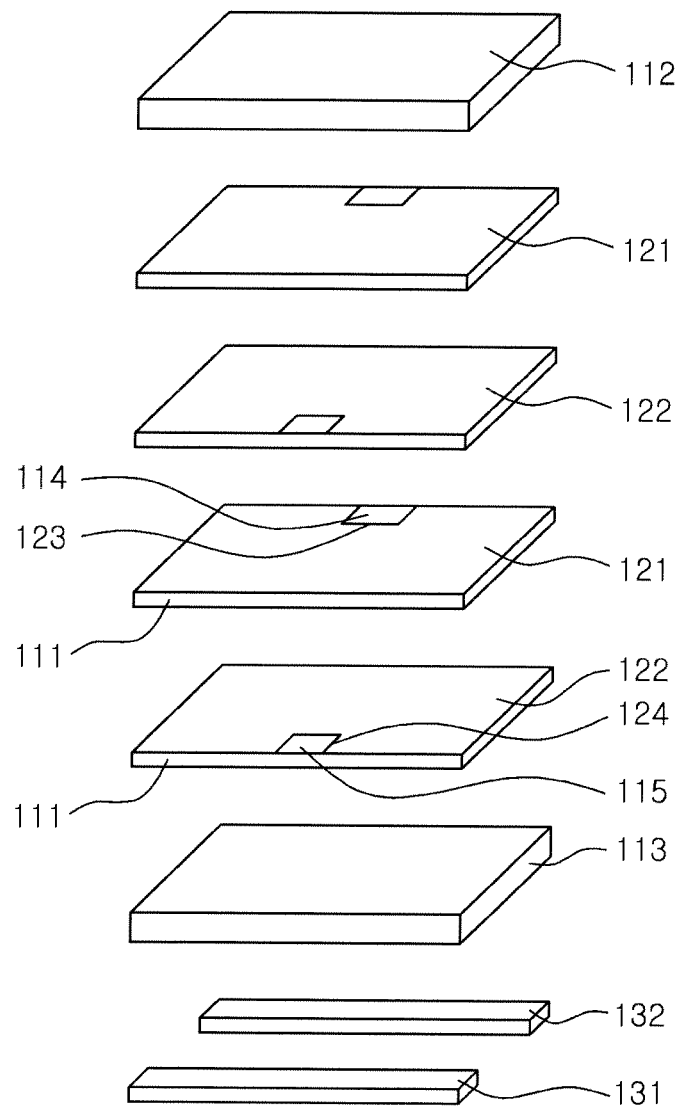
FIGS. 8A and 8B are schematic perspective views showing a multi-layered ceramic capacitor according to another embodiment of the present invention.
Figure 8B:
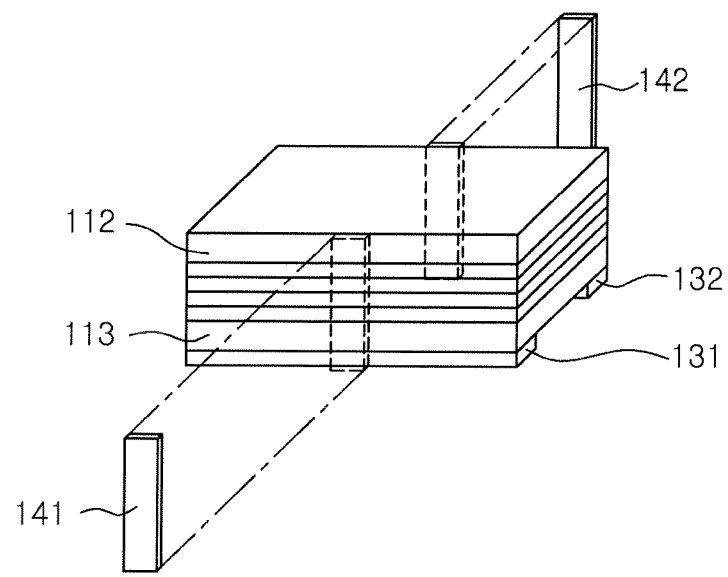

FIGS. 8A and 8B schematically show a multi-layered ceramic capacitor according to another embodiment of the present invention.

Referring to FIGS. 8A and 8B, first and second groove parts 123 and 124 may be formed to face each other at both lateral sides of first and second internal electrodes 121 and 122 in a width direction.

In this case, first and second margin parts 114 and 115 of a dielectric layer 111 may be formed to face each other in the vicinity of both lateral surfaces of the dielectric layer 111 in the width direction so as to correspond to the first and second groove parts 123 and 124.

In addition, first and second connecting electrodes 141 and 142 may vertically contact the second and first margin parts 115 and 114 at both lateral surfaces of a ceramic body 110, respectively, to electrically connect the plurality of first and second internal electrodes 121 and 122 that are vertically overlapped with each other to each other in a vertical direction.

In this case, first and second external electrodes 131 and 132 may be formed to be spaced apart from each other in parallel with each other in the width direction of the dielectric layer 111 at a lower surface of a lower cover layer 113 so as to correspond to the first and second connecting electrodes 141 and 142.

Here, since structures of the dielectric layer 111 of the ceramic body 110, the first and second internal electrodes 121 and 122, upper and lower cover layers 112 and 113, and first and second external electrodes are similar to those in the above-mentioned embodiment, a detailed description thereof will be omitted in order to avoid an overlapped description.

FIGS. 9A through 9E show a multi-layered ceramic capacitor 100' according to an embodiment of another aspect of the present invention.

Here, since structures of a dielectric layer 111 of a ceramic body 110, first and second internal electrodes 121 and 122, upper and lower cover layers 112 and 113, and first and second external electrodes 131 and 132 are similar to those in the above-mentioned embodiment, a detailed description thereof will be omitted in order to avoid an overlapped description, but only structures of first and second via electrodes 143 and 144, which are components corresponding to the first and second connecting electrodes, will be described in detail.

Figure 9A:
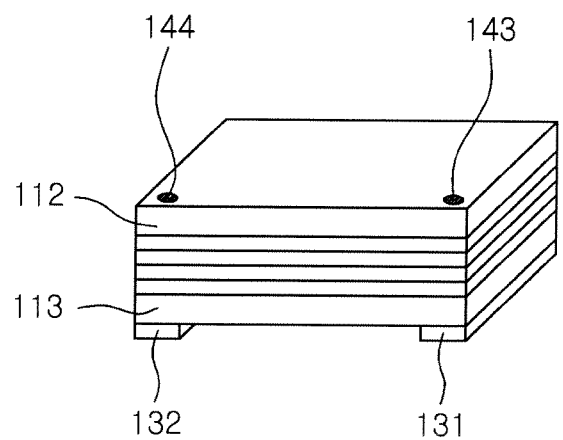
FIGS. 9A through 9E are schematic perspective views showing a multi-layered ceramic capacitor according to an embodiment of another aspect of the present invention.
Figure 9B:
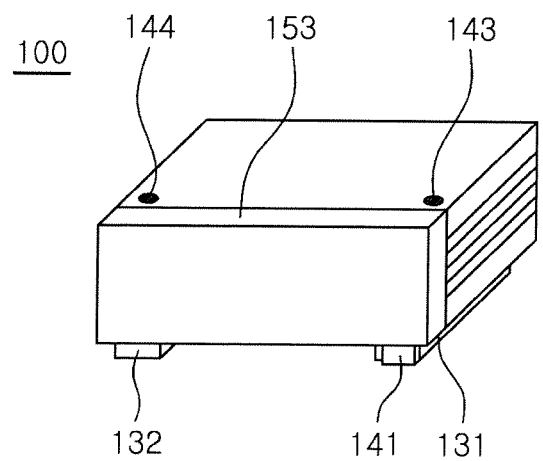
Figure 9C:
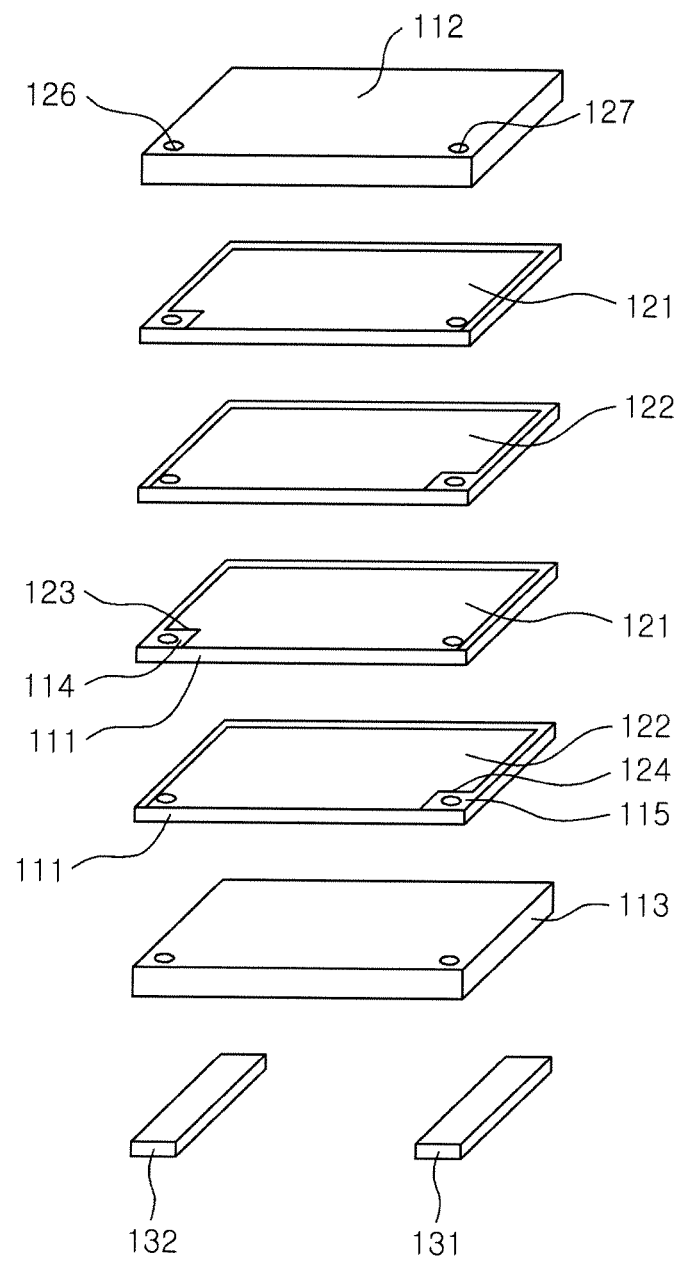
Figure 9D:
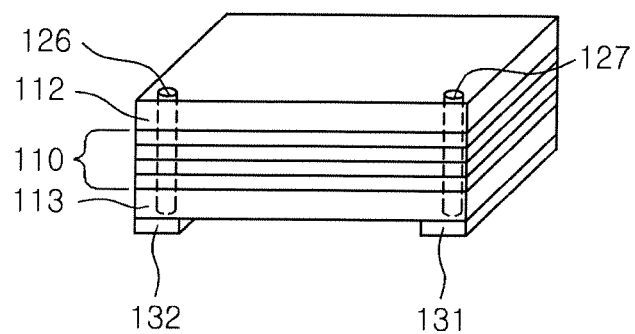
Figure 9E:
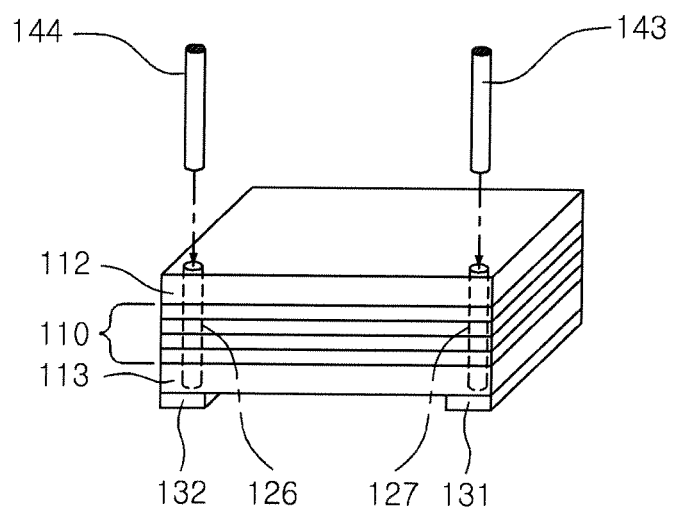
Figure 10A:
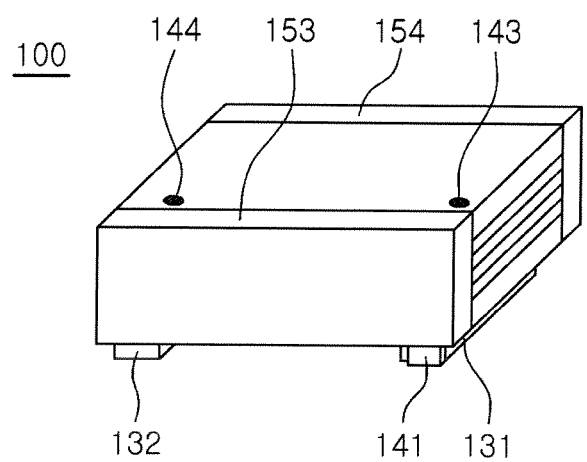
FIGS. 10A through 10D are schematic perspective views showing a multi-layered ceramic capacitor according to another embodiment of the present invention.
Figure 10B:
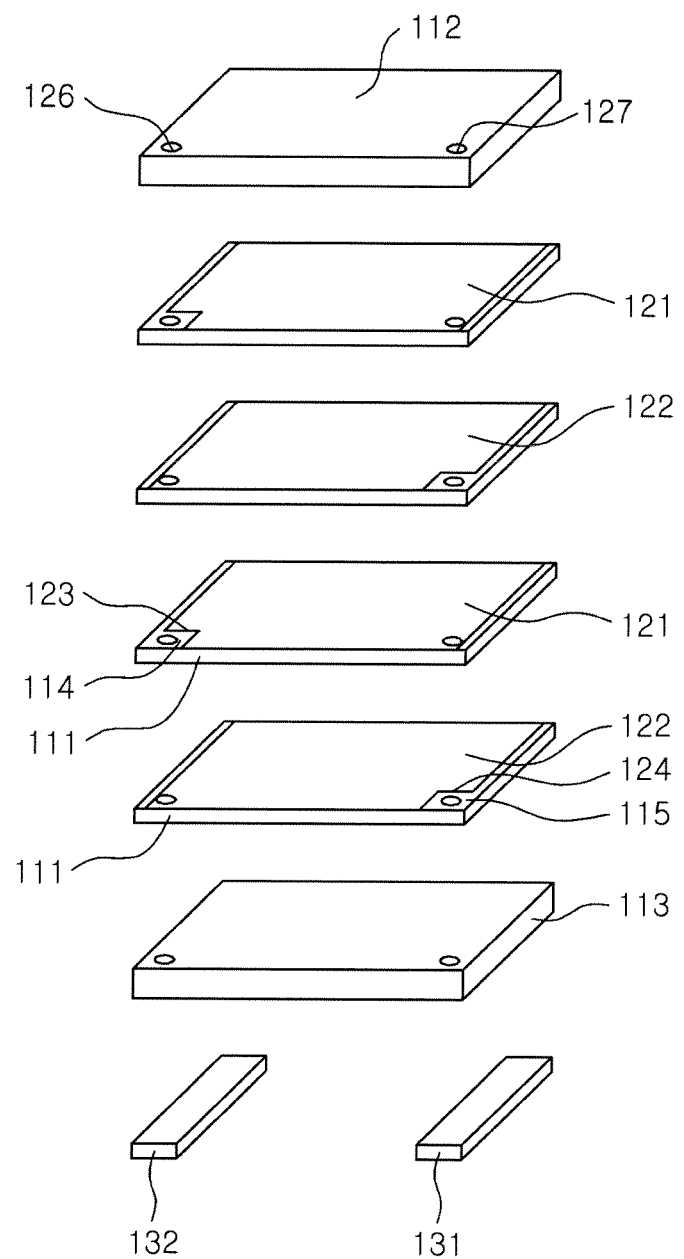
Figure 10C:
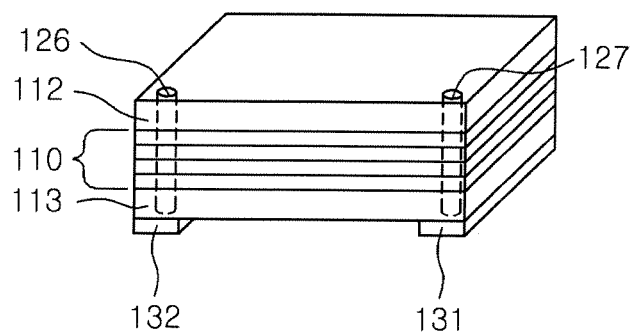
Figure 10D:
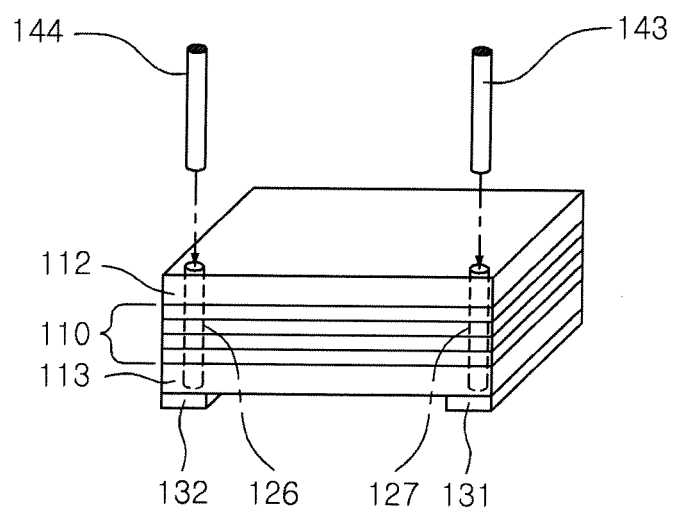

Referring to FIGS. 9A and 9E, the first via electrode 143 may vertically penetrate through the second margin parts 115 vertically overlapped with each other and a lower cover layer 113 so as not to contact inner peripheral surfaces of second groove parts 124 formed in the second internal electrodes 122 to vertically connect a plurality of first internal electrodes 121 to each other.

In addition, the second via electrode 144 may vertically penetrate through the first margin parts 114 vertically overlapped with each other and the lower cover layer 113 so as not to contact inner peripheral surfaces of first groove parts 123 formed in the first internal electrodes 121 to vertically connect a plurality of second internal electrodes 122 to each other.

In this case, first and second via holes 126 and 127 may be formed at the first and second margin parts 114 and 115 so that the second and first via electrodes 144 and 143 may penetrate therethrough, respectively. These via holes may be vertically formed at positions of the internal electrodes corresponding to that of the margin part and at positions of the upper and lower cover layers 112 and 113 corresponding thereto to vertically penetrate through a capacitor body to connect the capacitor body.

That is, the first and second via electrodes 143 and 144 may electrically connect the plurality of first and second internal electrodes 121 and 122 multi-layered in the ceramic body 110, that is, from first and second internal electrodes 121 and 122 positioned at the uppermost position to first and second internal electrodes 121 and 122 positioned at the lowermost position, respectively, and lower end portions of the first and second via electrodes 143 and 144 may contact the first and second external electrodes 131 and 132 so as to be electrically connected thereto, respectively.

In the present embodiment, the case in which a front side of the first and second internal electrodes 121 and 122 is exposed through an edge of the dielectric layer ill and the remaining three sides are formed to have the margin parts in the dielectric layer 111 is shown and described. Therefore, one insulating side part 153 may be formed at the front surface of the ceramic body 110.

However, the present invention is not limited thereto, but front and back sides of the first and second internal electrodes 121 and 122 may be exposed through edges of the dielectric layer 111 and the margin parts may be formed at left and right portions of the dielectric layer 111 as shown in FIGS. 10A through 10D. Therefore, insulating side parts 153 and 154 may be formed at the front and back sides of the ceramic body 110, respectively.

Figure 11A:
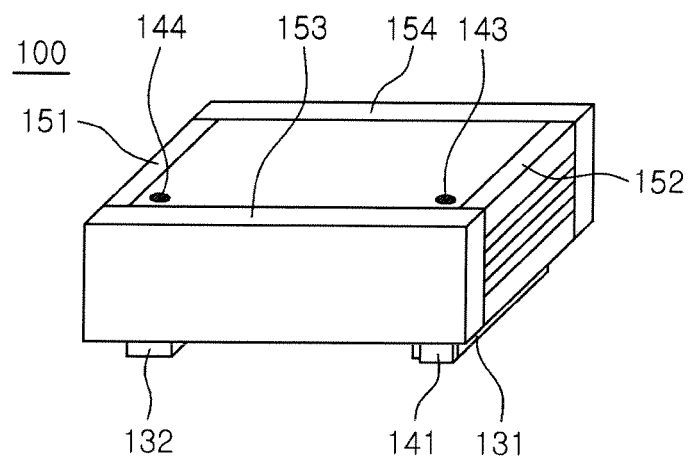
FIGS. 11A through 11C are schematic perspective views showing a multi-layered ceramic capacitor according to another embodiment of the present invention.
Figure 11B:
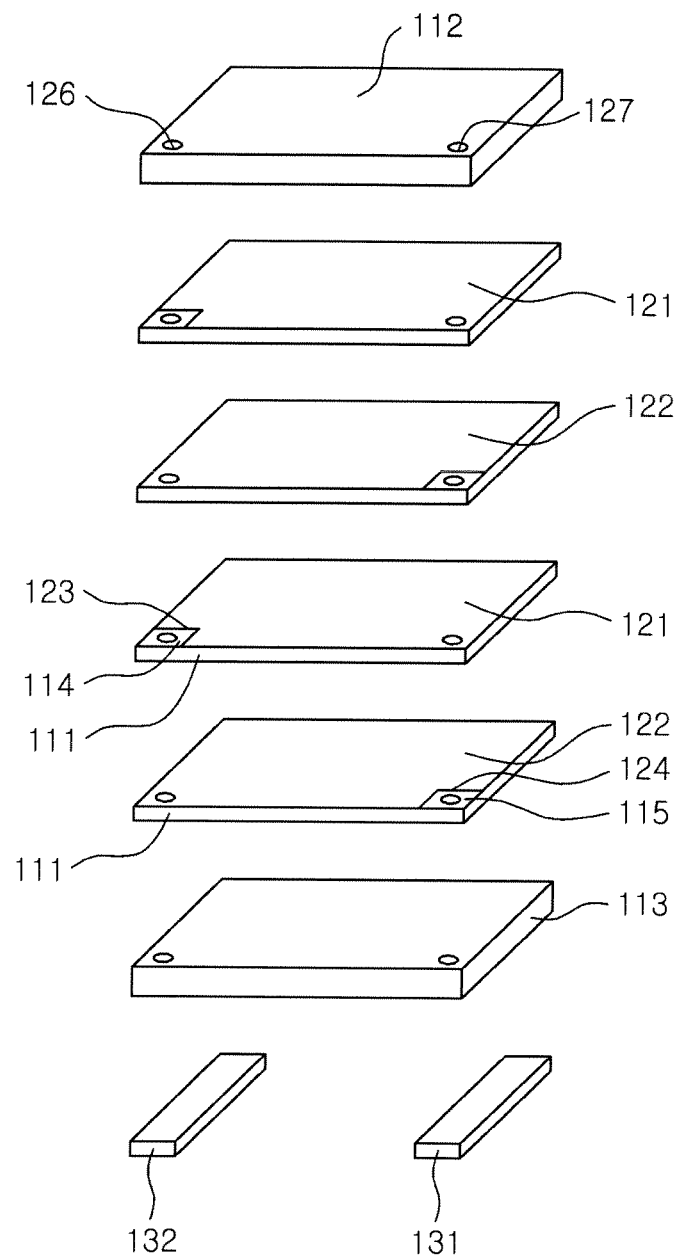
Figure 11C:
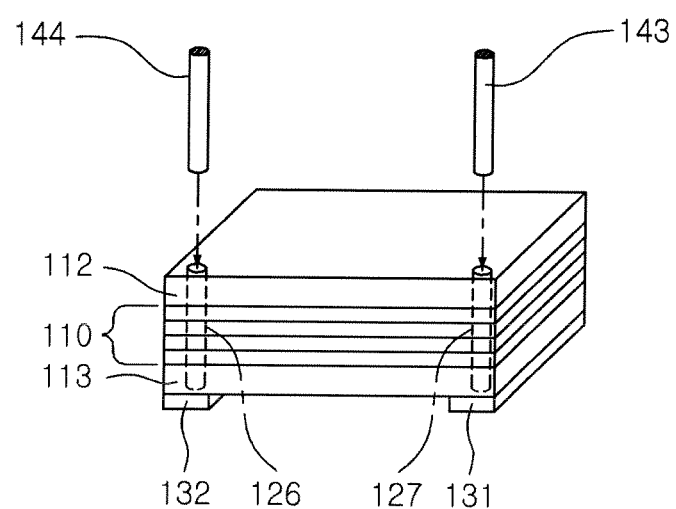

In addition, as shown in FIGS. 11A through 11C, all of the four sides of the first and second internal electrodes 121 and 122 except for the first and second margin parts 114 and 115 may be exposed through edges of the dielectric layer 111. In this case, insulating side parts 151 through 154 may be formed at all of the four lateral surfaces of the ceramic body 110 so as to cover all of the exposed portions of the first and second internal electrodes 121 and 122.

Figure 12A:
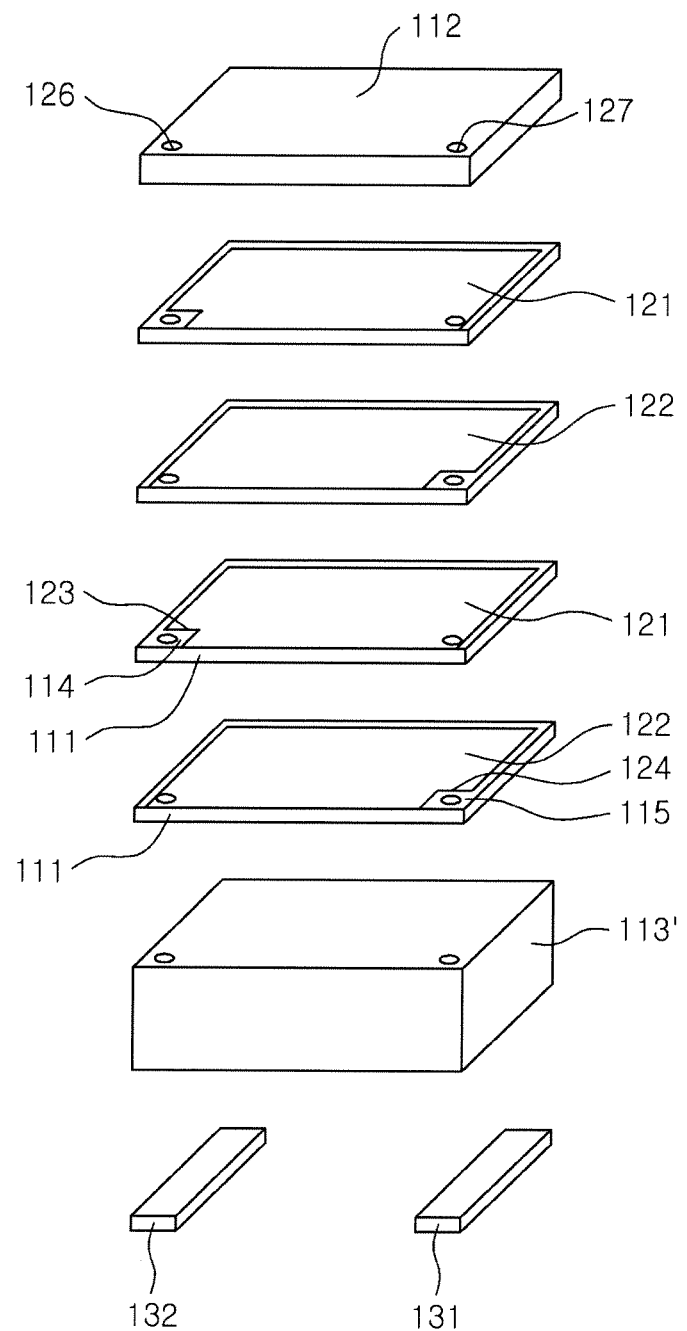
FIGS. 12A and 12B are schematic perspective views showing a multi-layered ceramic capacitor according to another embodiment of the present invention.
Figure 12B:
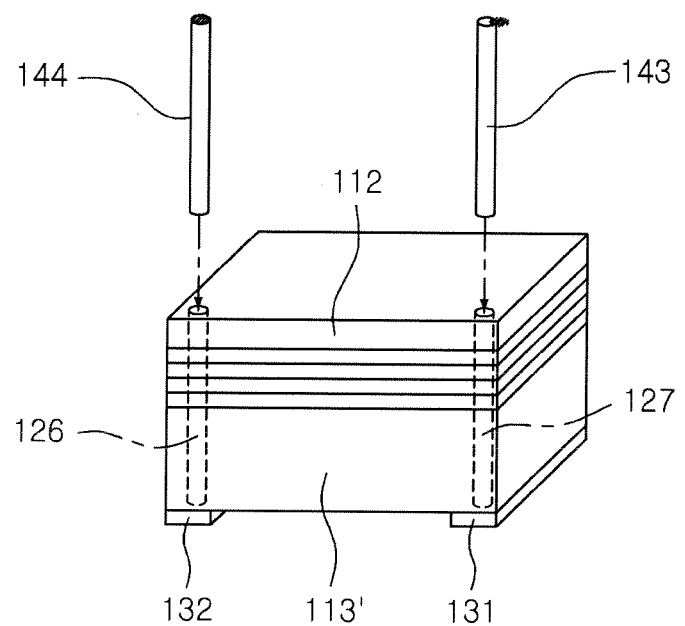

Referring to FIGS. 12A and 12B, a lower cover layer 113' may have a thickness thicker than that of the upper cover layer 112 by increasing the number of multi-layered ceramic sheets.

Figure 13A:
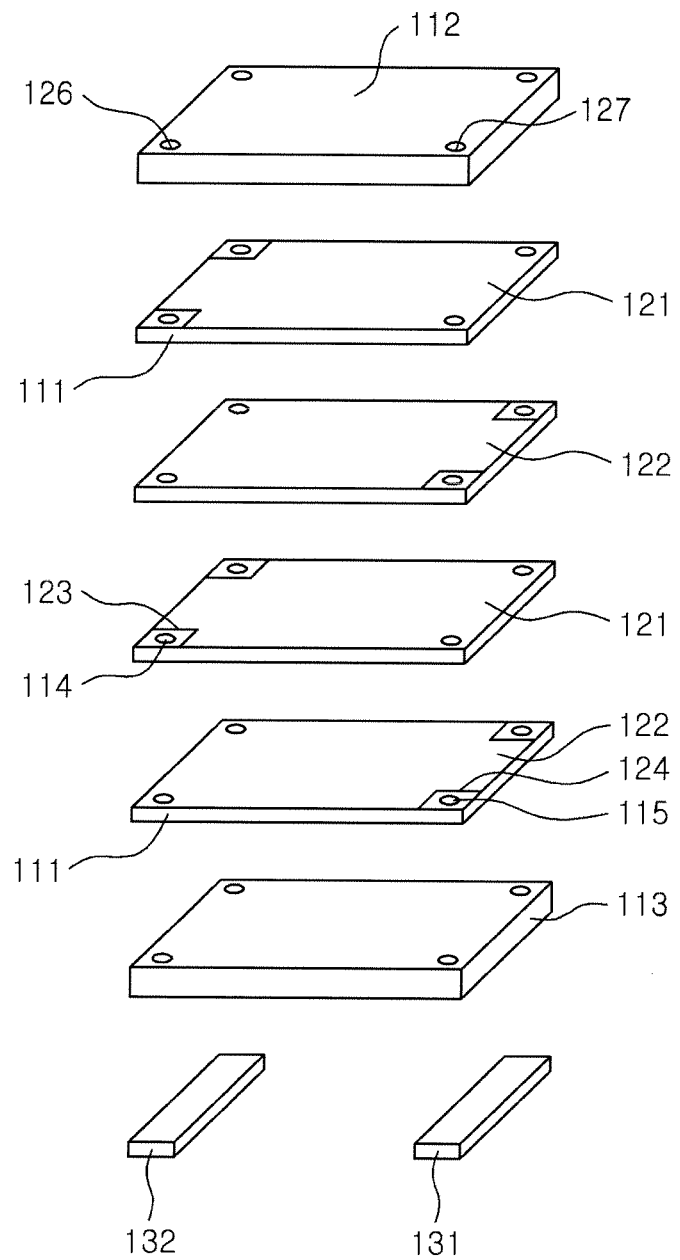
FIGS. 13A and 13B are schematic perspective views showing a multi-layered ceramic capacitor according to another embodiment of the present invention.
Figure 13B:
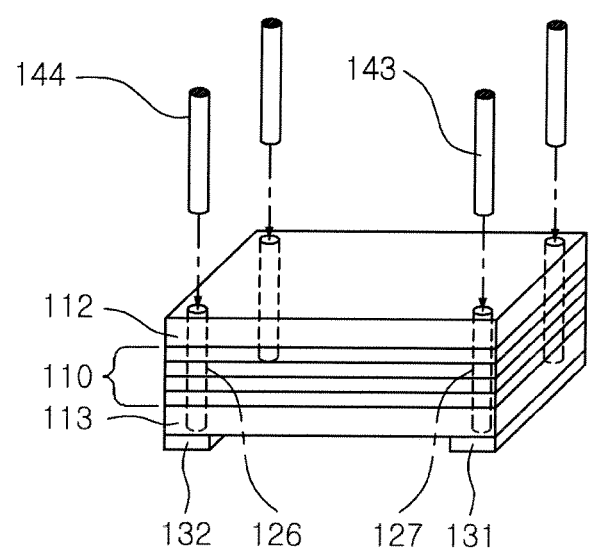

FIGS. 13A and 13B schematically show a multi-layered ceramic capacitor according to another embodiment of the present invention.

Referring to FIGS. 13A and 13B, a first groove part 123 may be formed at each of two corner parts of a left portion of the first internal electrode 121, and a second groove part 123 may be formed at each of two corner parts of a right portion of the second internal electrode 122.

In this case, two first margin parts 114 and two second margin parts 115 of the dielectric layer 111 may be formed to face each other at corner parts of both end surfaces of the dielectric layer 111 so as to correspond to the first and second groove parts 123 or 124.

The first and second via holes 126 and 127 may be formed at the first and second margin parts 114 and 115 so that second and first via electrodes 144 and 143 penetrate therethrough, respectively, wherein these via holes may be vertically formed at positions of the internal electrodes corresponding to that of the margin part and at positions of the upper and lower cover layers 112 and 113 corresponding thereto and vertically penetrate through a capacitor body to connect the capacitor body.

Therefore, the first and second via electrodes 143 and 144 may electrically connect the plurality of first and second internal electrodes 121 and 122 multi-layered in the ceramic body 110, that is, from first and second internal electrodes 121 and 122 positioned at the uppermost position to first and second internal electrodes 121 and 122 positioned at the lowermost position, respectively, in a vertical direction, and lower end portions of the first and second via electrodes 143 and 144 may contact the first and second external electrodes 131 and 132 so as to be electrically connected thereto, respectively.

Here, since structures of the dielectric layer 111 of the ceramic body 110, the first and second internal electrodes 121 and 122, and upper and lower cover layers 112 and 113 are the same as those in the above-mentioned embodiment, a detailed description thereof will be omitted in order to avoid an overlapped description.

Figure 14A:
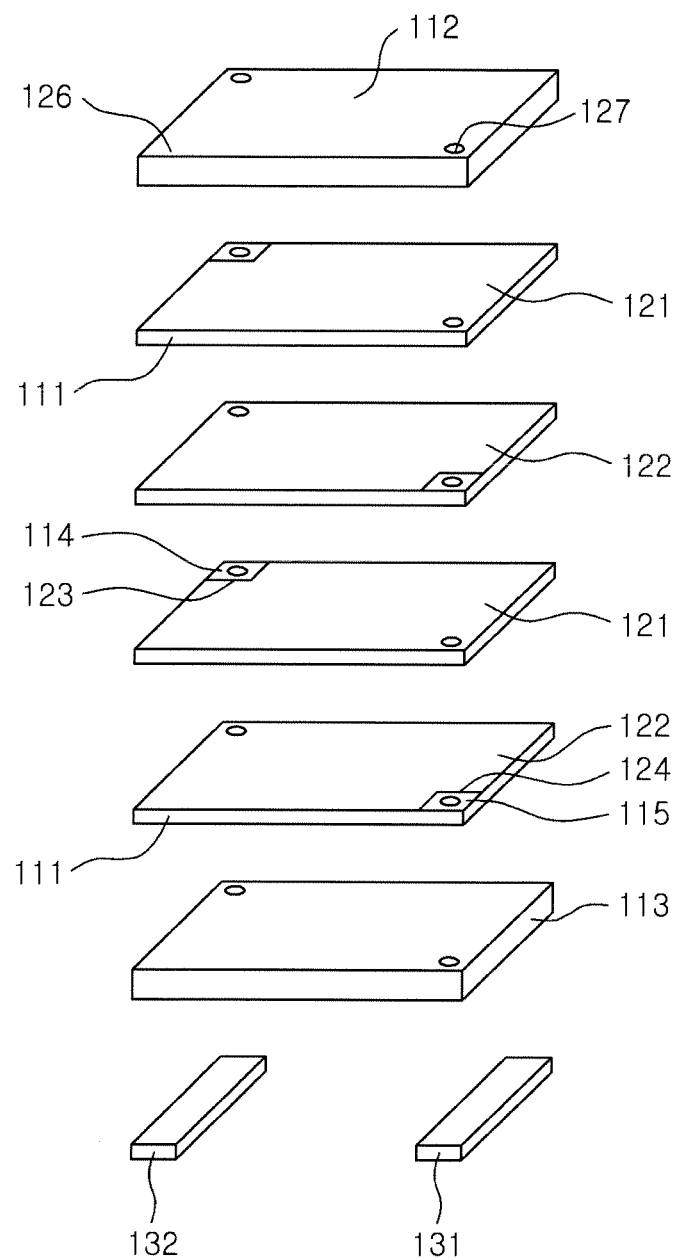
FIGS. 14A and 14B are schematic perspective views showing a multi-layered ceramic capacitor according to another embodiment of the present invention.
Figure 14B:
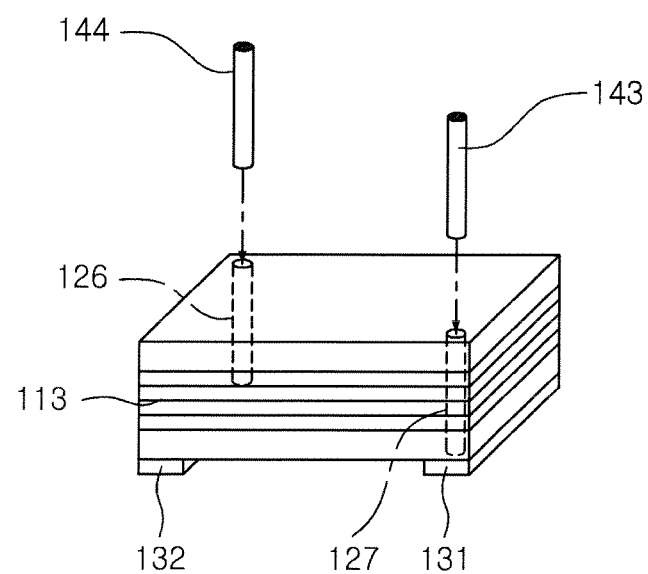

FIGS. 14A and 14B schematically show a multi-layered ceramic capacitor according to another embodiment of the present invention.

Referring to FIGS. 14A and 142, first and second groove parts 123 and 124 may be formed to diagonally face each other at corner parts of first and second internal electrodes 121 and 122.

In this case, first and second margin parts 114 and 115 of a dielectric layer 111 may be formed to diagonally face each other at corner parts of the dielectric layer 111 so as to correspond to the first and second groove parts 123 and 124.

The first and second via holes 126 and 127 may be formed at the first and second margin parts 114 and 115 so that second and first via electrodes 144 and 143 penetrate therethrough, respectively, wherein these via holes may be vertically formed at positions of the internal electrodes corresponding to that of the margin part and at positions of the upper and lower cover layers 112 and 113 corresponding thereto and vertically penetrate through a capacitor body to connect the capacitor body.

Therefore, the first and second via electrodes 143 and 144 may electrically connect the plurality of first and second internal electrodes 121 and 122 multi-layered in the ceramic body 110, that is, from first and second internal electrodes 121 and 122 positioned at the uppermost position to first and second internal electrodes 121 and 122 positioned at the lowermost position, respectively, in a vertical direction, and lower end portions of the first and second via electrodes 143 and 144 may contact the first and second external electrodes 131 and 132 so as to be electrically connected thereto, respectively.

In addition, first and second connecting electrodes 141 and 142 may vertically contact the second and first margin parts 115 and 114 at both lateral surfaces of a ceramic body 110, respectively, to electrically connect the plurality of first and second internal electrodes 121 and 122 that are vertically overlapped with each other to each other in a vertical direction.

Here, since structures of the dielectric layer 111 of the ceramic body 110, the first and second internal electrodes 121 and 122, upper and lower cover layers 112 and 113, and first and second external electrodes 131 and 132 are similar to those in the above-mentioned embodiment, a detailed description thereof will be omitted in order to avoid an overlapped description.

Figure 15A:
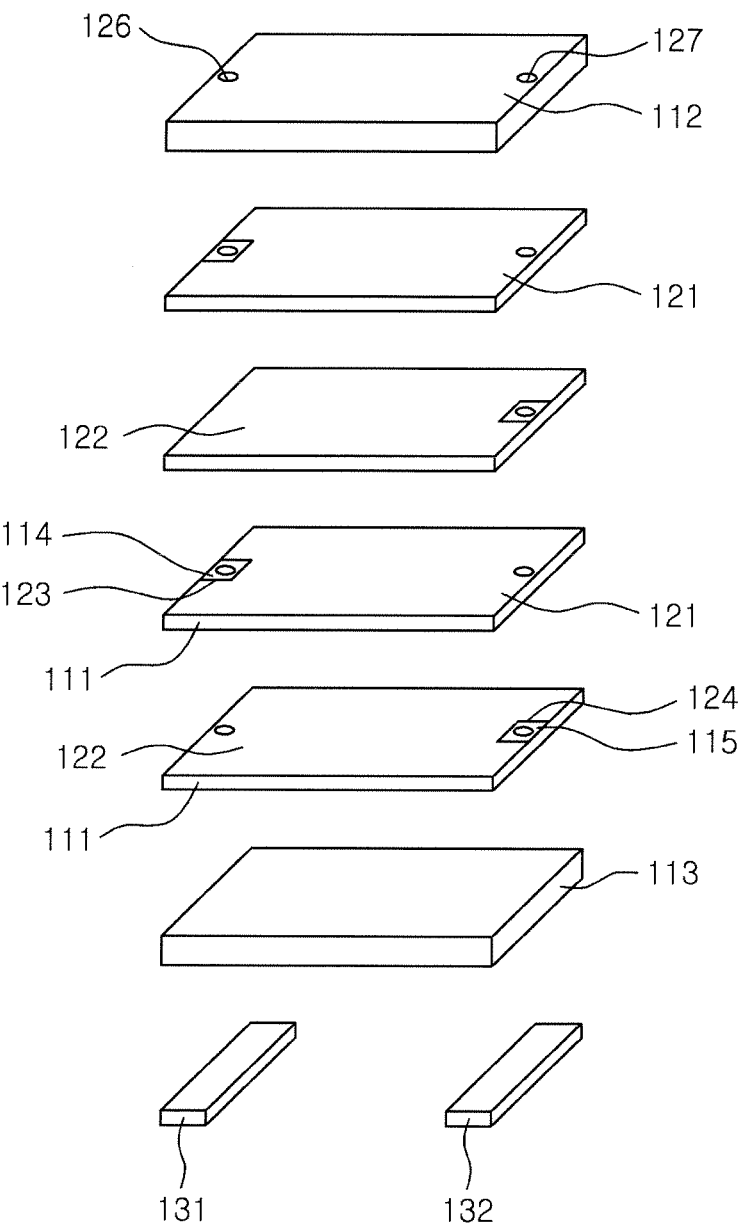
FIGS. 15A and 15B are schematic perspective views showing a multi-layered ceramic capacitor according to another embodiment of the present invention.
Figure 15B:
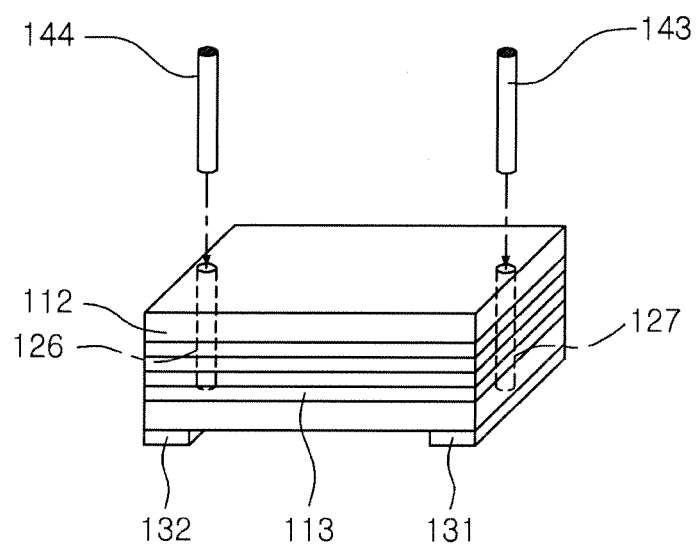

FIGS. 15A and 15B schematically show a multi-layered ceramic capacitor according to another embodiment of the present invention.

Referring to FIGS. 15A and 15B, first and second groove parts 123 and 124 may be formed to face each other at both end sides of first and second internal electrodes 121 and 122 in a length direction.

In this case, first and second margin parts 114 and 115 of a dielectric layer 111 may be formed to face each other in the vicinity of both end surfaces of the dielectric layer 111 in the length direction so as to correspond to the first and second groove parts 123 or 124.

The first and second via holes 126 and 127 may be formed at the first and second margin parts 114 and 115 so that second and first via electrodes 144 and 143 penetrate therethrough, respectively, wherein these via holes may be vertically formed at positions of the internal electrodes corresponding to that of the margin part and at positions of the upper and lower cover layers 112 and 113 corresponding thereto and vertically penetrate through a capacitor body to connect the capacitor body.

Therefore, the first and second via electrodes 143 and 144 may electrically connect the plurality of first and second internal electrodes 121 and 122 multi-layered in the ceramic body 110, that is, from first and second internal electrodes 121 and 122 positioned at the uppermost position to first and second internal electrodes 121 and 122 positioned at the lowermost position, respectively, in a vertical direction, and lower end portions of the first and second via electrodes 143 and 144 may contact the first and second external electrodes 131 and 132 so as to be electrically connected thereto, respectively.

Here, since structures of the dielectric layer 111 of the ceramic body 110, the first and second internal electrodes 121 and 122, upper and lower cover layers 112 and 113, and first and second external electrodes are similar to those in the above-mentioned embodiment, a detailed description thereof will be omitted in order to avoid an overlapped description.

Figure 16A:
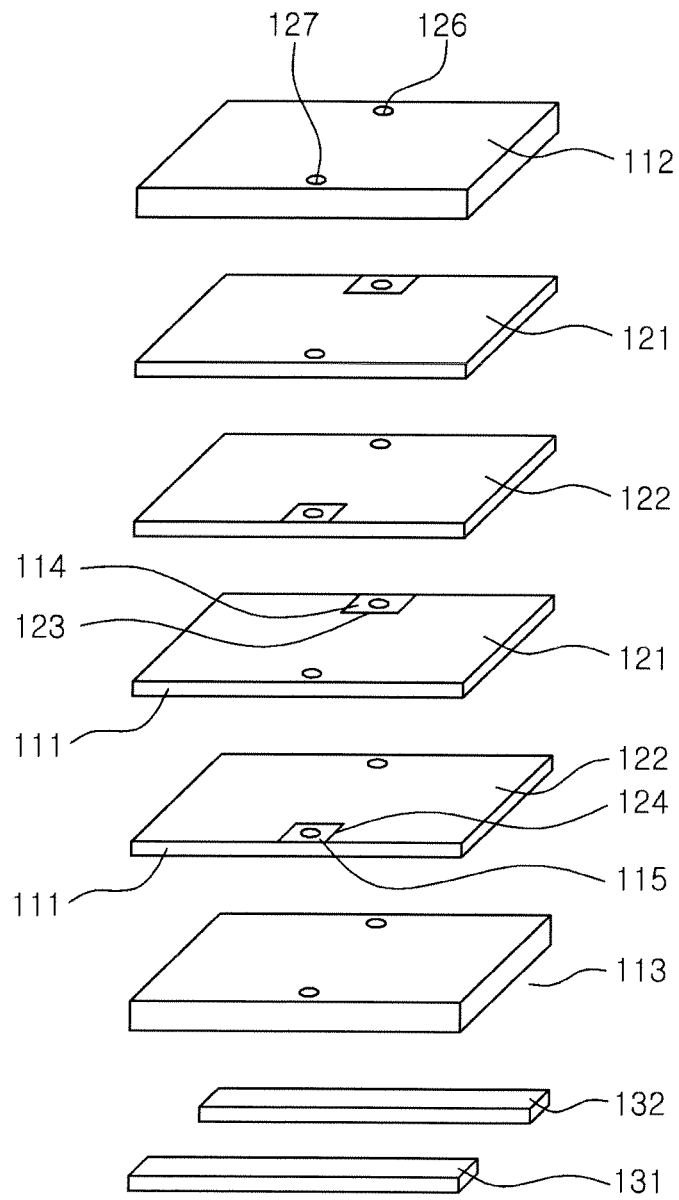
FIGS. 16A and 16B are schematic perspective views showing a multi-layered ceramic capacitor according to another embodiment of the present invention.
Figure 16B:
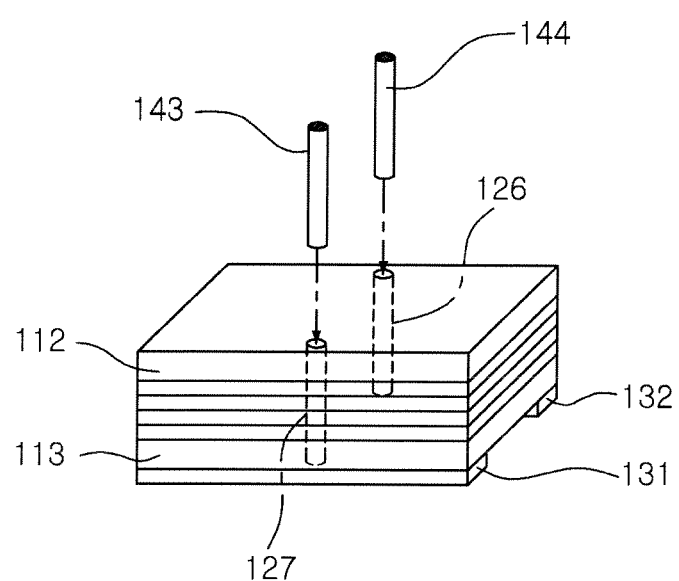

FIGS. 16A and 16B schematically show a multi-layered ceramic capacitor according to another embodiment of the present invention.

Referring to FIGS. 16A and 16B, first and second groove parts 123 and 124 may be formed to face each other at both lateral sides of first and second internal electrodes 121 and 122 in a width direction.

In this case, first and second margin parts 114 and 115 of a dielectric layer 111 may be formed to face each other in the vicinity of both lateral surfaces of the dielectric layer 111 in the width direction so as to correspond to the first and second groove parts 123 or 124.

The first and second via holes 126 and 127 may be formed at the first and second margin parts 114 and 115 so that second and first via electrodes 144 and 143 penetrate therethrough, respectively, wherein these via holes may be vertically formed at positions of the internal electrodes corresponding to that of the margin part and at positions of the upper and lower cover layers 112 and 113 corresponding thereto and vertically penetrate through a capacitor body to connect the capacitor body.

Therefore, the first and second via electrodes 143 and 144 may electrically connect the plurality of first and second internal electrodes 121 and 122 multi-layered in the ceramic body 110, that is, from first and second internal electrodes 121 and 122 positioned at the uppermost position to first and second internal electrodes 121 and 122 positioned at the lowermost position, respectively, in a vertical direction, and lower end portions of the first and second via electrodes 143 and 144 may contact the first and second external electrodes 131 and 132 so as to be electrically connected thereto, respectively.

In this case, first and second external electrodes 131 and 132 may be formed to be spaced apart from each other in parallel with each other in the width direction of the dielectric layer 111 at a lower surface of a lower cover layer 113 so as to correspond to the first and second connecting electrodes 141 and 142.

Here, since structures of the dielectric layer 111 of the ceramic body 110, the first and second internal electrodes 121 and 122, upper and lower cover layers 112 and 113, and first and second external electrodes 131 and 132 are similar to those in the above-mentioned embodiment, a detailed description thereof will be omitted in order to avoid an overlapped description.

Meanwhile, the following Table 1 shows an intensity of acoustic noise according to thicknesses of the upper and lower cover layers 112 and 113 in the multi-layered ceramic capacitor 100 in which the first and second connecting electrodes 141 and 142 are used, and the following Table 2 shows an intensity of acoustic noise according to thicknesses of the upper and lower cover layers 112 and 113 in the multi-layered ceramic capacitor 100' in which the first and second via electrodes 143 and 144 are used.

TABLE 1

| Thickness of upper cover layer (μm) | Thickness of lower cover layer (μm) | Acoustic noise (dB) |
|---|---|---|
| 20 | 20 | 24.8 |
| 21 | 49 | 19.4 |
| 21 | 98 | 16.9 |
| 20 | 150 | 17.1 |
| 21 | 192 | 17.8 |
| 20 | 297 | 18.7 |
| 21 | 401 | 19.5 |
| 20 | 494 | 22.8 |

TABLE 2

| Thickness of upper cover layer (μm) | Thickness of lower cover layer (μm) | Acoustic noise (dB) |
|---|---|---|
| 20 | 20 | 24.2 |
| 20 | 50 | 19.2 |
| 21 | 101 | 16.8 |
| 20 | 154 | 17.1 |
| 21 | 198 | 17.9 |
| 20 | 302 | 18.5 |
| 20 | 400 | 19.3 |
| 21 | 496 | 22.4 |

Referring to Tables 1 and 2, since it may be confirmed that the acoustic noise was significantly reduced when the thickness of the lower cover layer is in a range of 50 to 400 μm, a preferably thickness of the lower cover layer for reducing vibration may be 50 to 400 μm.

As set forth above, according to the embodiments of the present invention, since the first and second internal electrodes are electrically connected to the first and second external electrodes formed at the lowermost surface through the first and second connecting electrodes formed in a direction in which the dielectric layers are multilayered, respectively, the overlapped area between the internal electrodes having different polarities may be increased, such that the capacitance of the product may be increased without increasing the number of multi-layered dielectric layers or the permittivity while thinning the thicknesses of the dielectric layer and internal electrodes.

While the present invention has been shown and described in connection with the embodiments, it will be apparent to those skilled in the art that modifications and variations can be made without departing from the spirit and scope of the invention as defined by the appended claims.

What is claimed is:

1. A multi-layered ceramic capacitor comprising:
a ceramic body including a plurality of dielectric layers multilayered therein;
a plurality of first and second internal electrodes alternately formed on the plurality of dielectric layers, having at least one first and second groove parts that are not overlapped with each other at at least one side thereof, respectively, so that first and second margin parts that are not overlapped with each other are formed on the plurality of dielectric layers, and including at least one side entirely exposed through edges of the dielectric layer except for the first and second groove parts;
upper and lower cover layers formed at upper and lower portions of the ceramic body, respectively;
first and second external electrodes formed to be spaced apart from each other at a lower surface of the lower cover layer;
a first connecting electrode contacting outer peripheral surfaces of a plurality of second margin parts vertically overlapped with each other to connect exposed portions of the plurality of first internal electrodes to each other and including a lower end portion electrically connected to the first external electrode;
a second connecting electrode contacting outer peripheral surfaces of a plurality of first margin parts vertically overlapped with each other to connect exposed portions of the plurality of second internal electrodes to each other and including a lower end portion electrically connected to the second external electrode; and
an insulating side part formed so as to cover lateral surfaces of the ceramic body and the upper and lower cover layers at which the first and second internal electrodes are exposed,
wherein each of the first and second external electrodes extends from one side of the lower surface of the lower cover layer to an opposite side of the lower surface of the lower cover layer.

2. The multi-layered ceramic capacitor of claim 1, wherein the lower cover layer has a thickness thicker than that of the upper cover layer.

3. The multi-layered ceramic capacitor of claim 2, wherein when a half of a thickness of a portion including the ceramic body and the upper and lower cover layers is defined as A, a thickness of the lower cover layer is defined as B, and a half of a thickness of the ceramic body is defined as C,
a ratio in which a central portion of the ceramic body deviates from a central portion of the portion including the ceramic body and the upper and lower cover layers in a thickness direction, that is, (B+C)/A satisfies a range of 1.06 to 1.8 (1.06≤(B+C)/A≤1.8).

4. The multi-layered ceramic capacitor of claim 1, wherein the lower cover layer has a thickness of 50 to 400 μm.

5. The multi-layered ceramic capacitor of claim 1, wherein the insulating side part is formed of at least one material selected among an insulating resin, an insulating ceramic material, and an insulating resin filler.

6. The multi-layered ceramic capacitor of claim 1, wherein the first groove part is formed at at least one corner part of the first internal electrode and the second groove part is formed at at least one of the remaining corner parts of the second internal electrode that is not overlapped with the first groove part.

7. The multi-layered ceramic capacitor of claim 6, wherein the first groove part is formed at each of two corner parts of one surface of the first internal electrode, and the second groove part is formed at each of two corner parts of the other surface of the second internal electrode.

8. The multi-layered ceramic capacitor of claim 6, wherein the first and second groove parts are formed to diagonally face each other.

9. The multi-layered ceramic capacitor of claim 1, wherein the first and second groove parts are formed at both end sides of the first and second internal electrodes facing each other, respectively.

10. The multi-layered ceramic capacitor of claim 1, wherein the first and second groove parts are formed at lateral sides of the first and second internal electrodes facing each other, respectively.

11. A multi-layered ceramic capacitor comprising:
a ceramic body including a plurality of dielectric layers multilayered therein;
a plurality of first and second internal electrodes alternately formed on the plurality of dielectric layers, having at least one first and second groove parts that are not overlapped with each other at at least one side thereof, respectively, so that first and second margin parts that are not overlapped with each other are formed on the plurality of dielectric layers, and including at least one side entirely exposed through edges of the dielectric layer except for the first and second groove parts;

upper and lower cover layers formed at upper and lower portions of the ceramic body, respectively;

first and second external electrodes formed to be spaced apart from each other at a lower surface of the lower cover layer;

a first via electrode vertically penetrating through the second margin parts so as not to contact inner peripheral surfaces of the second groove parts to vertically connect the plurality of first internal electrodes to each other and including a lower end portion penetrating through the lower cover layer to be electrically connected to the first external electrode;

a second via electrode vertically penetrating through the first margin parts so as not to contact inner peripheral surfaces of the first groove parts to vertically connect the plurality of second internal electrodes to each other and including a lower end portion penetrating through the lower cover layer to be electrically connected to the second external electrode; and an insulating side part formed so as to cover lateral surfaces of the ceramic body and the upper and lower cover layers at which the first and second internal electrodes are exposed, wherein each of the first and second external electrodes extends from one side of the lower surface of the lower cover layer to an opposite side of the lower surface of the lower cover layer, wherein the first and second groove parts are formed at both end sides of the first and second internal electrodes facing each other, respectively.

12. The multi-layered ceramic capacitor of claim 11, wherein the lower cover layer has as thickness thicker than that of the upper cover layer.

13. The multi-layered ceramic capacitor of claim 11, wherein when a half of a thickness obtained by adding those of the ceramic body and the upper and lower cover layers, a half of a thickness of the lower cover layer, and a half of a thickness of the ceramic body are sequentially defined as A, B, C, a ratio in which a central portion of the ceramic body deviates from a central portion of the ceramic body and the upper and lower cover layers in a thickness direction, that is, $(B+C)/A$ satisfies the range of 1.06 to 1.8 ($1.06 \leq (B+C)/A \leq 1.8$).

14. The multi-layered ceramic capacitor of claim 11, wherein the lower cover layer has a thickness of 50 to 400 μm.

15. The multi-layered ceramic capacitor of claim 11, wherein the insulating side part is formed of at least one material selected among an insulating resin, an insulating ceramic material, and an insulating resin filler.

16. The multi-layered ceramic capacitor of claim 11, wherein the first and second groove parts are formed at lateral sides of the first and second internal electrodes facing each other, respectively.

17. A multi-layered ceramic capacitor comprising:

a ceramic body including a plurality of dielectric layers multi-layered therein;

a plurality of first and second internal electrodes alternately formed on the plurality of dielectric layers, having at least one first and second groove parts that are not overlapped with each other at at least one side thereof, respectively, so that first and second margin parts that are not overlapped with each other are formed on the plurality of dielectric layers, and including at least one side entirely exposed through edges of the dielectric layer except for the first and second groove parts;

upper and lower cover layers formed at upper and lower portions of the ceramic body, respectively;

first and second external electrodes formed to be spaced apart from each other at a lower surface of the lower cover layer;

a first via electrode vertically penetrating through the second margin parts so as not to contact inner peripheral surfaces of the second groove parts to vertically connect the plurality of first internal electrodes to each other and including a lower end portion penetrating through the lower cover layer to be electrically connected to the first external electrode;

a second via electrode vertically penetrating through the first margin parts so as not to contact inner peripheral surfaces of the first groove parts to vertically connect the plurality of second internal electrodes to each other and including a lower end portion penetrating through the lower cover layer to be electrically connected to the second external electrode; and an insulating side part formed so as to cover lateral surfaces of the ceramic body and the upper and lower cover layers at which the first and second internal electrodes are exposed wherein each of the first and second external electrodes extends from one side of the lower surface of the lower cover layer to an opposite side of the lower surface of the lower cover layer, wherein the first groove part is formed at each of two corner parts of one surface of the first internal electrode, and the second groove part is formed at each of two corner parts of the other surface of the second internal electrode.

18. The multi-layered ceramic capacitor of claim 17, wherein the first groove part is formed at each of two corner parts of one surface of the first internal electrode, and the second groove part is formed at each of two corner parts of the other surface of the second internal electrode.

19. The multi-layered ceramic capacitor of claim 17, wherein the first and second groove parts are formed to diagonally face each other.

* * * * *